United States Patent
Kim

(10) Patent No.: US 11,650,929 B2
(45) Date of Patent: May 16, 2023

(54) MEMORY SYSTEM AND OPERATION METHOD THEREOF

(71) Applicant: SK hynix Inc., Gyeonggi-do (KR)

(72) Inventor: Ju Hyun Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 21 days.

(21) Appl. No.: 17/245,307

(22) Filed: Apr. 30, 2021

(65) Prior Publication Data
US 2022/0171570 A1    Jun. 2, 2022

(30) Foreign Application Priority Data
Dec. 2, 2020   (KR) .................. 10-2020-0166644

(51) Int. Cl.
G06F 12/10   (2016.01)
G06F 3/06    (2006.01)

(52) U.S. Cl.
CPC ............ G06F 12/10 (2013.01); G06F 3/0604 (2013.01); G06F 3/0644 (2013.01); G06F 3/0659 (2013.01); G06F 3/0673 (2013.01); G06F 2212/657 (2013.01)

(58) Field of Classification Search
CPC .... G06F 3/0659; G06F 3/0604; G06F 3/0644; G06F 3/0673; G06F 12/10; G06F 2212/656; G06F 2212/657
See application file for complete search history.

(56) References Cited

U.S. PATENT DOCUMENTS

| 10,810,123 | B1* | 10/2020 | Xu ........................ G06F 12/0804 |
| 2016/0019160 | A1* | 1/2016 | Mohan ................ G06F 12/1009 711/208 |
| 2016/0364181 | A1* | 12/2016 | McGlaughlin ........ G06F 3/0629 |
| 2019/0369908 | A1* | 12/2019 | Koo ..................... G11C 11/5642 |

FOREIGN PATENT DOCUMENTS

KR   10-2020-0059936 A    5/2020

OTHER PUBLICATIONS

An article titled "Everything You Always Wanted to Know About SDRAM (Memory): But Were Afraid to Ask" published by Rajinder Gill on Aug. 15, 2010 (Year: 2010).*
An article titled Everything you need to know about SLC, MLC, & TLC NAND Flash published Jul. 27, 2015 (Year: 2015).*

* cited by examiner

Primary Examiner — Tim T Vo
Assistant Examiner — Janice M. Girouard
(74) Attorney, Agent, or Firm — IP & T Group LLP

(57) ABSTRACT

A memory system includes: a memory device including a plurality of memory dies including the plurality of planes; and a controller configured to store data in a plurality of stripes each including physical pages of different planes and a plurality of unit regions, the controller comprising: a processor configured to queue write commands in a write queue, and select, among the plurality of stripes, a stripe in which data chunks corresponding to the write commands are to be stored; and a striping engine configured to receive queued orders of the write commands, and output, by referring to a lookup table, addresses of unit regions, in which the data chunks are to be arranged, to the processor, wherein the processor in configured to control the memory device to store the data chunks in the unit regions corresponding to the outputted addresses of the selected stripe.

23 Claims, 20 Drawing Sheets

800

| QUEUED ORDER | SUBPAGE(1-3) | CH(1-4) | PLANE(1-4) | CLUSTER(1-2) |
|---|---|---|---|---|
| 1 | 1 | 1 | 1 | 1 |
| 2 | 1 | 1 | 1 | 2 |
| ... | ... | ... | ... | ... |
| 9 | 1 | 2 | 1 | 1 |
| ... | ... | ... | ... | ... |
| 17 | 1 | 3 | 1 | 1 |
| ... | ... | ... | ... | ... |
| 25 | 1 | 4 | 1 | 1 |
| ... | ... | ... | ... | ... |
| 33 | 2 | 1 | 1 | 1 |
| ... | ... | ... | ... | ... |
| 65 | 3 | 1 | 1 | 1 |
| ... | ... | ... | ... | ... |
| 96 | 3 | 4 | 4 | 2 |

Next cluster ← → Next stripe

FIG. 8B

| QUEUED ORDER | SUBPAGE(1-3) | CH(1-4) | PLANE(1-4) | CLUSTER(1-2) |
|---|---|---|---|---|
| 1 | 1 | 1 | 1 | 1 |
| 2 | 1 | 1 | 1 | 2 |
| ... | ... | ... | ... | ... |
| 9 | 1 | 2 | 1 | 1 |
| ... | ... | ... | ... | ... |
| 17 | 1 | 3 | 1 | 1 |
| ... | ... | ... | ... | ... |
| 25 | 1 | 4 | 1 | 1 |
| ... | ... | ... | ... | ... |
| 33 | 2 | 1 | 1 | 1 |
| ... | ... | ... | ... | ... |
| 65 | 3 | 1 | 1 | 1 |
| ... | ... | ... | ... | ... |
| 96 | 3 | 4 | 4 | 2 |

Next stripe

Next cluster

| QUEUED ORDER | SUBPAGE(1-3) | CH(1-4) | PLANE(1-4) | CLUSTER(1-2) |
|---|---|---|---|---|
| 1 | 1 | 1 | 1 | 1 |
| 2 | 1 | 1 | 1 | 2 |
| ... | ... | ... | ... | ... |
| 9 | 1 | 2 | 1 | 1 |
| ... | ... | ... | ... | ... |
| 17 | 1 | 3 | 1 | 1 |
| ... | ... | ... | ... | ... |
| 25 | 1 | 4 | 1 | 1 |
| ... | ... | ... | ... | ... |
| 31 | 2 | 1 | 1 | 1 |
| ... | ... | ... | ... | ... |
| 61 | 3 | 1 | 1 | 1 |
| ... | ... | ... | ... | ... |
| 90 | 3 | 4 | 3 | 2 |

900

Next cluster →

Next stripe ↰

FIG. 10B

| QUEUED ORDER | SUBPAGE(1-3) | CH(1-4) | PLANE(1-4) | CLUSTER(1-2) |
|---|---|---|---|---|
| 1 | 1 | 1 | 1 | 1 |
| 2 | 1 | 1 | 1 | 2 |
| ... | ... | ... | ... | ... |
| 9 | 2 | 1 | 1 | 1 |
| ... | ... | ... | ... | ... |
| 17 | 3 | 1 | 1 | 1 |
| ... | ... | ... | ... | ... |
| 25 | 1 | 2 | 1 | 1 |
| ... | ... | ... | ... | ... |
| 49 | 1 | 3 | 1 | 1 |
| ... | ... | ... | ... | ... |
| 73 | 1 | 4 | 1 | 1 |
| ... | ... | ... | ... | ... |
| 96 | 3 | 4 | 4 | 2 |

| QUEUED ORDER | SUBPAGE(1-3) | CH(1-4) | PLANE(1-4) | CLUSTER(1-2) |
|---|---|---|---|---|
| 1 | 1 | 1 | 1 | 1 |
| 2 | 1 | 1 | 1 | 2 |
| ... | ... | ... | ... | ... |
| 9 | 1 | 2 | 1 | 1 |
| ... | ... | ... | ... | ... |
| 17 | 1 | 3 | 1 | 1 |
| ... | ... | ... | ... | ... |
| 25 | 1 | 4 | 1 | 1 |
| ... | ... | ... | ... | ... |
| 32 | 1 | 4 | 4 | 2 |

1200

Next cluster →

Next stripe ↺

MEMORY SYSTEM AND OPERATION METHOD THEREOF

CROSS-REFERENCE TO RELATED APPLICATION

This application claims priority under 35 U.S.C. § 119 to Korean Patent Application No. 10-2020-0166644, filed on Dec. 2, 2020, which is incorporated by reference herein in its entirety.

BACKGROUND

1. Field

One or more embodiments described herein relate to a memory system including a memory device.

2. Discussion of the Related Art

Many portable electronic devices (e.g., mobile phones, digital cameras, laptop computers, etc.) use a memory system that includes one or more memory devices for storing data. The memory system may be used as a main memory device or an auxiliary memory device. Some memory systems have no moving parts and thus offer improved stability, durability, high information access speeds, and low power consumption. Examples of these types of memory systems include universal serial bus (USB) memory devices, memory cards having various interfaces, and solid state drives (SSD).

SUMMARY

In accordance with one or more embodiments, a memory system is provided with improved access performance. These and/or other embodiments provide a memory system that is capable of quickly performing striping of write data and an operation method thereof. One or more embodiments of a method for operating these and/or other types of memory systems are also provided.

In accordance with an embodiment, a memory system includes: a memory device including a plurality of memory blocks that include a plurality of physical pages, a plurality of planes including the plurality of memory blocks, and a plurality of memory dies including the plurality of planes, the plurality of planes being configured to operate in parallel to one another; and a controller configured to store data in a plurality of stripes each including physical pages of different planes and a plurality of unit regions, the controller including: a processor configured to queue write commands in a write queue, and select, among the plurality of stripes, a stripe in which data chunks corresponding to the write commands are to be stored; and a striping engine configured to receive queued orders of the write commands, and output, by referring to a lookup table, addresses of unit regions, in which the data chunks are to be arranged, to the processor, wherein the processor is configured to control the memory device to store the data chunks in the unit regions corresponding to the outputted addresses of the selected stripe.

In accordance with an embodiment, a method for operating a memory system including a plurality of memory blocks that include a plurality of physical pages, a plurality of planes including the plurality of memory blocks and a plurality of memory dies including the plurality of planes, the plurality of planes being configured to operate in parallel to one another, the method includes: queuing write commands in a write queue; selecting, among a plurality of stripes, a stripe in which data chunks corresponding to the write commands are to be stored, each of the plurality of stripes including physical pages of different planes and a plurality of unit regions; determining, by referring to a lookup table, addresses of unit regions corresponding to queued orders of the write commands, as addresses of unit regions in which the data chunks are to be arranged; and storing the data chunks in the unit regions of the selected stripe corresponding to the determined addresses.

In accordance with an embodiment, a memory system includes: a memory device including a plurality of memory blocks that include a plurality of physical pages, a plurality of planes including the plurality of memory blocks, and a plurality of memory dies including the plurality of planes, the plurality of planes being configured to operate in parallel to one another; and a controller configured to: store data in a plurality of stripes, each including physical pages of different planes and a plurality of unit regions, queue write commands in a write queue; select, among the plurality of stripes, a stripe in which data chunks corresponding to the write commands are to be stored; determine, by referring to a lookup table, addresses of unit regions corresponding to queued orders of the write commands, as addresses of unit regions in which the data chunks are to be arranged; and store the data chunks in the unit regions of the selected stripe corresponding to the determined addresses.

Embodiments of the disclosure may provide a memory system with improved access performance and an operation method thereof.

Embodiments of the disclosure may provide a memory system capable of quickly performing striping of write data and an operation method thereof.

Effects to be achieved from the disclosure may not be limited to the above-mentioned effects. Other unmentioned effects may be clearly understood from the following description by those having ordinary skill in the technical field to which the disclosure pertains.

BRIEF DESCRIPTION OF THE DRAWINGS

FIGS. 8A to 12B illustrate examples of lookup tables according to various striping modes.

DETAILED DESCRIPTION

Figure 1:
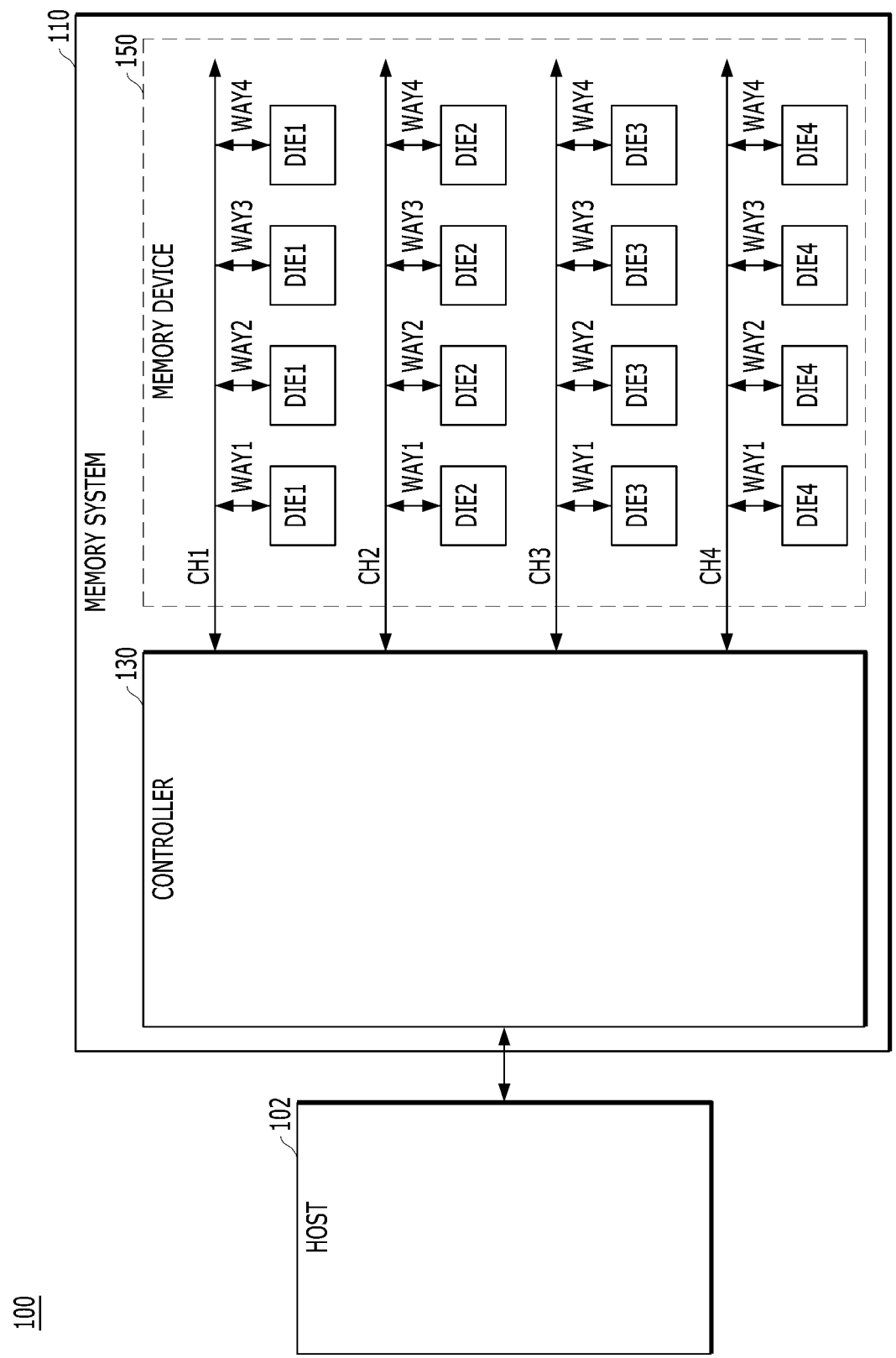
FIG. 1 illustrates an embodiment of a data processing system including a memory system.

Various embodiments will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

FIG. 1 is a block diagram illustrating an embodiment of a data processing system 100 which may include a host 102 operatively coupled to a memory system 110. The host 102 may include various portable electronic devices (e.g., mobile phone, MP3 player laptop computer) or various non-portable electronic devices (e.g., desktop computer, game machine, television (TV), projector, etc.).

The host 102 may include at least one operating system (OS), which manages and controls overall functions and operations of the host 102, and in some cases which may control, for example, operations between the host 102 and a user using the data processing system 100 or the memory system 110. The OS may support functions and operations corresponding to an intended purpose of the data processing system 100 and usage of a user. For example, the OS may be divided into a general OS and a mobile OS depending on the mobility of host 102. The general OS may be divided into a personal OS and an enterprise OS, for example, depending on the environment of a user.

The memory system 110 may include one or more types of storage devices. Examples include, but are not limited to, volatile memory devices (e.g., dynamic random access memory (DRAM) and a static RAM (SRAM)) and nonvolatile memory devices (e.g., a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory). The flash memory may have a 3-dimensional (3D) stack structure in some embodiments.

The memory system 110 may include a controller 130 and a memory device 150. The memory device 150 may store data for the host 102, and the controller 130 may control data storage into the memory device 150.

The controller 130 and the memory device 150 may be integrated, for example, into a single semiconductor device. In one embodiment, the controller 130 and the memory device 150 may be integrated as one semiconductor device to constitute a solid state drive (SSD). When the memory system 110 is used as an SSD, the operating speed of the host 102 connected to the memory system 110 can be improved.

In one embodiment, the controller 130 and the memory device 150 may be integrated as one semiconductor device to constitute a memory card. Examples of the memory card include a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, and universal flash storage (UFS) device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a group of nonvolatile memory devices and thus may retain data stored therein even when power is not supplied. The memory device 150 may store data provided from the host 102 in a program operation, and may provide data stored therein to the host 102 in a read operation. The memory device 150 may include a plurality of memory blocks 152, 154, 156 . . . , each of which may include a plurality of pages. Each of the pages may include a plurality of memory cells coupled to a word line. In an embodiment, the memory device 150 may be a flash memory group. A flash memory may have, for example, a 3-dimensional (3D) stack structure.

The controller 130 may control the memory device 150 in response to a request from the host 102. For example, the controller 130 may provide data read from the memory device 150 to the host 102, and may store data provided from the host 102 to the memory device 150. For this operation, controller 130 may control read, program and erase operations of the memory device 150.

A write request or a read request (provided to the controller 130 by the host 102) may include a logical address used in the host 102. For example, the logical address may be a logical block address (LBA) which is used in the file system of the operating system of the host 102.

The memory region of the memory device 150 may be identified, for example, by a physical address different from the logical address. In one embodiment, a different physical address may be allocated to each page of the memory device 150. The controller 130 may generate map data by mapping a logical address and a physical address so as to control the memory device 150. The controller 130 may store, in an internal memory, map data based on logical addresses. For example, the map data may indicate physical addresses corresponding to the logical addresses.

The memory device 150 may include a plurality of memory dies, which, for example, may be coupled to the controller 130 through a plurality of channels CH1 to CH4. In FIG. 1, the memory dies coupled to the plurality of channels CH1 to CH4 are identified as first to fourth memory dies DIE1 to DIE4, respectively. In one embodiment, the plurality of memory dies may be coupled to the plurality of channels CH1 to CH4 through a plurality of ways. The plurality of ways coupled to each channel may be identified as first to fourth ways WAY1 to WAY4, e.g., the first memory dies DIE1 may be coupled to a first channel CH1 through the first to fourth ways WAY1 to WAY4. The controller 130 may identify each memory die using a channel address and a way address. A different number of dies, channels, and/or ways may be used in other embodiments.

One channel may sequentially transfer commands to memory dies coupled to the channel, or may sequentially transfer data from the memory dies to the controller 130. In one embodiment, the plurality of memory dies which receive the commands through the channel may simultaneously perform command operations. Embodiments of each memory die are described, for example, with reference to FIG. 2.

Figure 2:
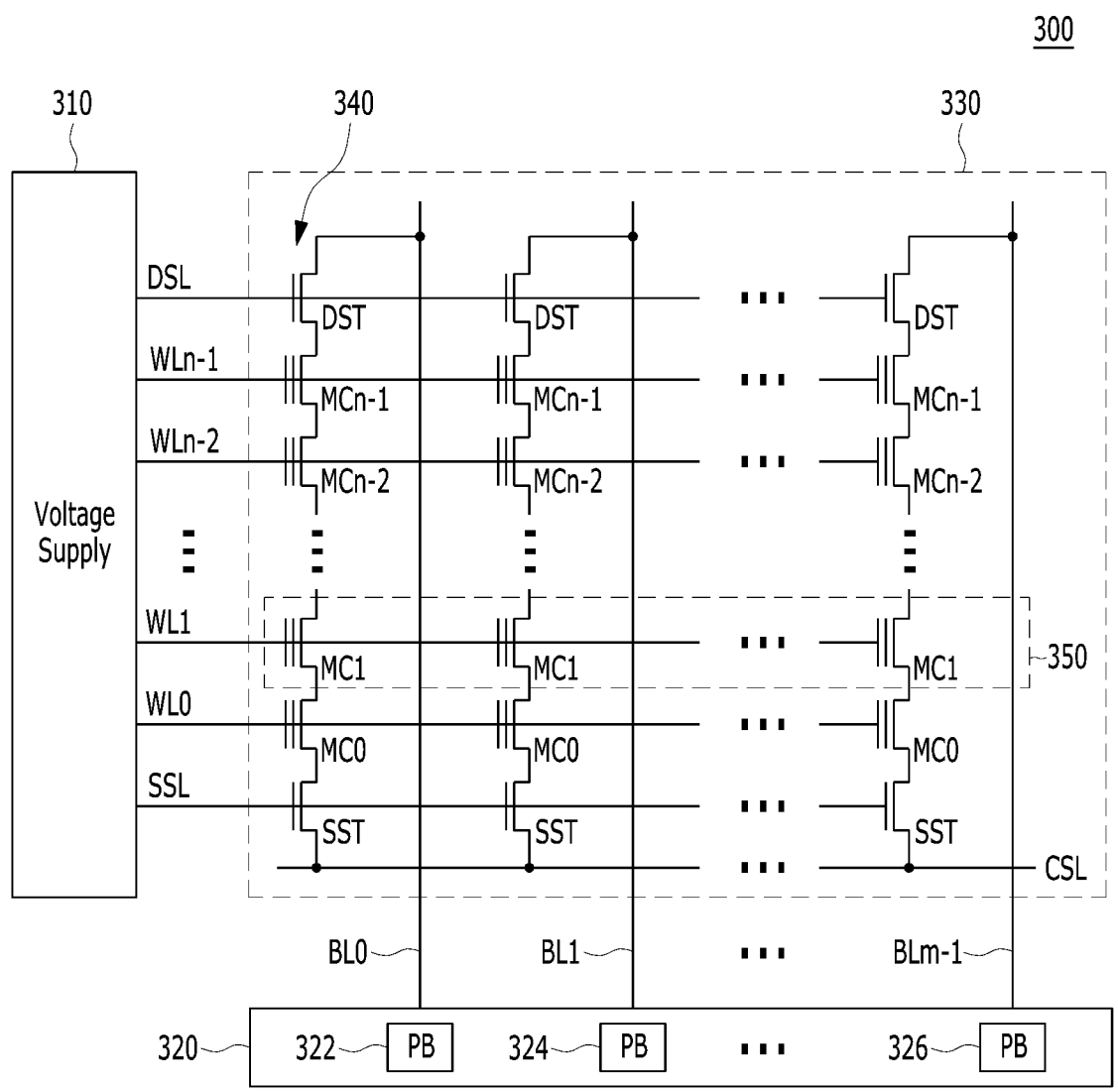
FIG. 2 illustrates an embodiment of a plane in a memory die.

FIG. 2 is a circuit diagram illustrating an example of a configuration of a plane 300 which may be included in each memory die. Each of the first to fourth memory dies DIE1 to DIE4 of FIG. 1 may include at least one plane. Also, FIG. 2 illustrates one memory block 330. However, plane 300 may include a plurality of memory blocks in other embodiments. In this case, memory block 330 may be a representative example of each of the plurality of memory blocks.

Referring to FIG. 2, the plane 300 may include a voltage supply 310, a read/write circuit 320 and a memory block 330. The memory block 330 may include a plurality of cell strings 340 coupled to a plurality of corresponding bit lines BL0 to BLm−1. The cell string 340 of each column may include one or more drain select transistors DST and one or more source select transistors SST. A plurality of memory cells or memory cell transistors MC0 to MCn−1 may be coupled in series between the drain and source select transistors DST and SST.

In an embodiment, each of the memory cells MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 2, the first cell string is coupled to the first bit line BL0 and the last cell string is coupled to the last bit line BLm−1. (In FIG. 2, 'DSL' denotes a drain select line, 'SSL' denotes a source select line, and 'CSL' denotes a common source line.)

FIG. 2 illustrates NAND flash memory cells, but a different type of memory cell may be used in other embodiments. For example, the memory cells may be NOR flash memory cells or hybrid flash memory cells including two or more types of memory cells combined therein. Also, in one or more embodiments, the memory device 150 including plane 300 may be a flash memory device including a conductive floating gate as a charge storage layer or a charge trap flash (CTF) memory device including an insulation layer as a charge storage layer.

The plane 300 may further include a voltage supply 310 which provides voltages (e.g., a program voltage, a read voltage and a pass voltage) to the word lines, for example, according to operation mode. The voltage generation operation of the voltage supply 310 may be controlled by a control circuit. Under the control of the control circuit, the voltage supply 310 may select one of the memory blocks (or sectors) of the memory cell array, may select one of the word lines of the selected memory block, and may provide the word line voltages to the selected word line and the unselected word lines as may be needed.

The plane 300 may include a read and write (read/write) circuit 320 controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer data to be stored in the memory cell array and may drive bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches.

The memory cells of the memory block 330 may be coupled to a plurality of word lines WL0 to WLn−1. Memory cells coupled to one word line may be referred to as a physical page. FIG. 2 illustrates a physical page 350 including memory cells MC1 which are coupled to the word line WL1. Memory cells may be accessed by the unit of page by the voltage supply 310 and the read/write circuit 320.

One memory die may sequentially receive commands, from a channel, for a plurality of planes. The plurality of planes which receive the commands may simultaneously perform command operations, each using a voltage supply and a read/write circuit.

Memory cells may be referred to as a single level cell (SLC) or a multi-level cell (MLC) depending on the number of bits which can be stored in one memory cell. A multi-level cell refers to a memory cell which, as one memory cell, can store data having at least two bits. For example, the multi-level cell may include a triple-level cell (TLC) or a quadruple-level cell (QLC).

Figure 3:
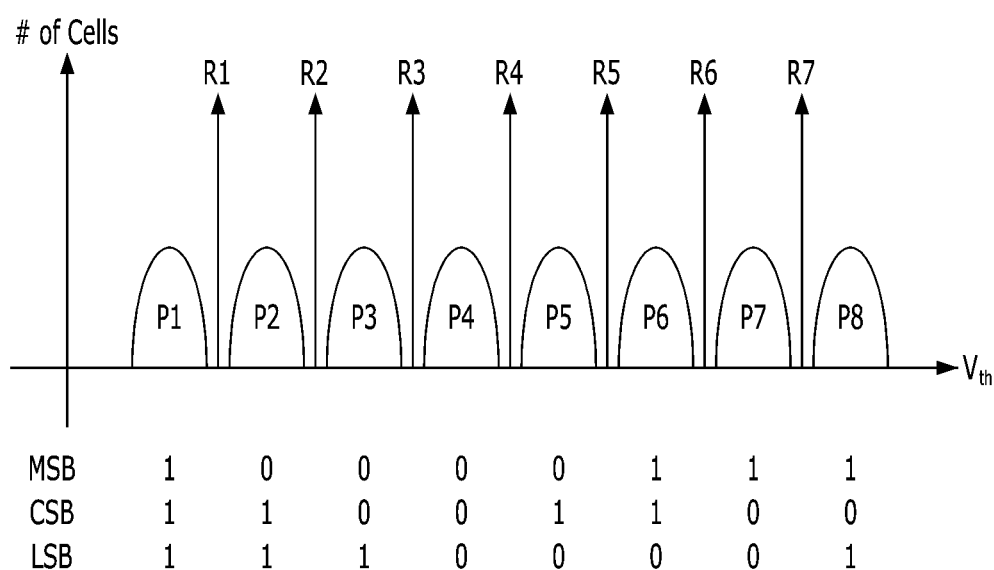
FIG. 3 illustrates an embodiment of a threshold voltage distribution of triple-level cells provided as an example of multi-level cells.

FIG. 3 is a graph illustrating an embodiment of a threshold voltage distribution of triple-level cells as an example of multi-level cells. When three bits are programmed in a triple-level cell, any one of $2^3$ (e.g., eight) threshold voltage distributions may be formed in the memory cell. Due to fine differences in electrical characteristics between a plurality of memory cells, the threshold voltages of memory cells programmed with the same data may form a certain range of a threshold voltage distribution. In the case of a triple-level cell (as illustrated in the drawing), eight threshold voltage distributions P1 to P8 may be formed. The eight threshold voltage distributions P1 to P8 may represent logic states that are different from one another. For example, a first threshold voltage distribution P1 of the eight threshold voltage distributions P1 to P8 may represent an erased state with a logic state of '111.' Three bits programmed in a triple-level cell may be referred to as a most significant bit (MSB), a central significant bit (CSB) and a least significant bit (LSB), respectively.

In one embodiment, the eight threshold voltage distributions P1 to P8 of the memory cells may be formed, for example, through a single program operation. In one embodiment, voltage supply 310 may perform a program operation and a verify pulse application operation. The program operation may include repeatedly performing a program pulse application operation for migrating threshold voltage distributions of the memory cells. The verify pulse application operation may include verifying whether threshold voltages of the memory cells correspond to threshold voltage distributions that correspond to data to be programmed. Through these operations, the eight threshold voltage distributions P1 to P8 of the memory cells may be formed. A program operation for forming, at once, a plurality of threshold voltage distributions corresponding to three bits may be referred to as a one-shot program operation.

Which logic state a memory cell has may be identified, for example, using a plurality of read voltages R1 to R7. In one embodiment, a memory cell may be turned on when a read voltage (e.g., having a level higher than its threshold voltage) is applied, and may be turned off when a read voltage (e.g., having a level lower than its threshold voltage) is applied. Data may be read by sensing a current formed in a bit line as the memory cell is turned on or off.

In the example of FIG. 3, each of the three bits may be read by applying different read voltages. For example, the voltage supply 310 may apply the first and fifth read voltages R1 and R5 to read the MSB. By applying the first and fifth read voltages R1 and R5, the program states P1, P6, P7 and P8 in which the MSB has a value of '1' may be distinguished from the program states P2 to P5 in which the MSB has a value of '0'. Similarly, the voltage supply 310 may apply the second, fourth and sixth read voltages R2, R4 and R6 to read the CSB, and may apply the third and seventh read voltages R3 and R7 to read the LSB.

In some embodiments, the three bits stored in a triple-level cell are not programmed, at once, by a one-shot program operation. In such a case, multiple operations may be performed and the voltage supply 130 may need to identify all the MSB, CSB and LSB by applying the total seven read voltages R1 to R7 to read the three bits.

Each of the triple-level cells in one physical page may include an MSB, a CSB and an LSB. MSBs, CSBs, and LSBs of one physical page may be handled as subpages, respectively. The subpages in one physical page may be referred to as an MSB page, a CSB page and an LSB page, respectively.

In one embodiment, the controller 130 may interleave commands for a plurality of memory dies and then may provide the interleaved commands to the memory device 150. Interleaving the commands may refer to the case where controller 130 determines a command providing order so that the commands may be sequentially provided to the plurality of memory dies. Since the plurality of memory dies may simultaneously operate based on the interleaved commands, throughput of the memory system 110 may be improved.

In order to improve the throughput of memory system 110, the controller 130 may collect data to be programmed based on a predetermined size, so that a plurality of physical pages may be simultaneously programmed and the data may be arranged in the plurality of physical pages. An explanation of how physical pages may be simultaneously programmed in accordance with one embodiment is given with respect to the hierarchical structure of memory device 150 described with reference to FIG. 4.

Figure 4:
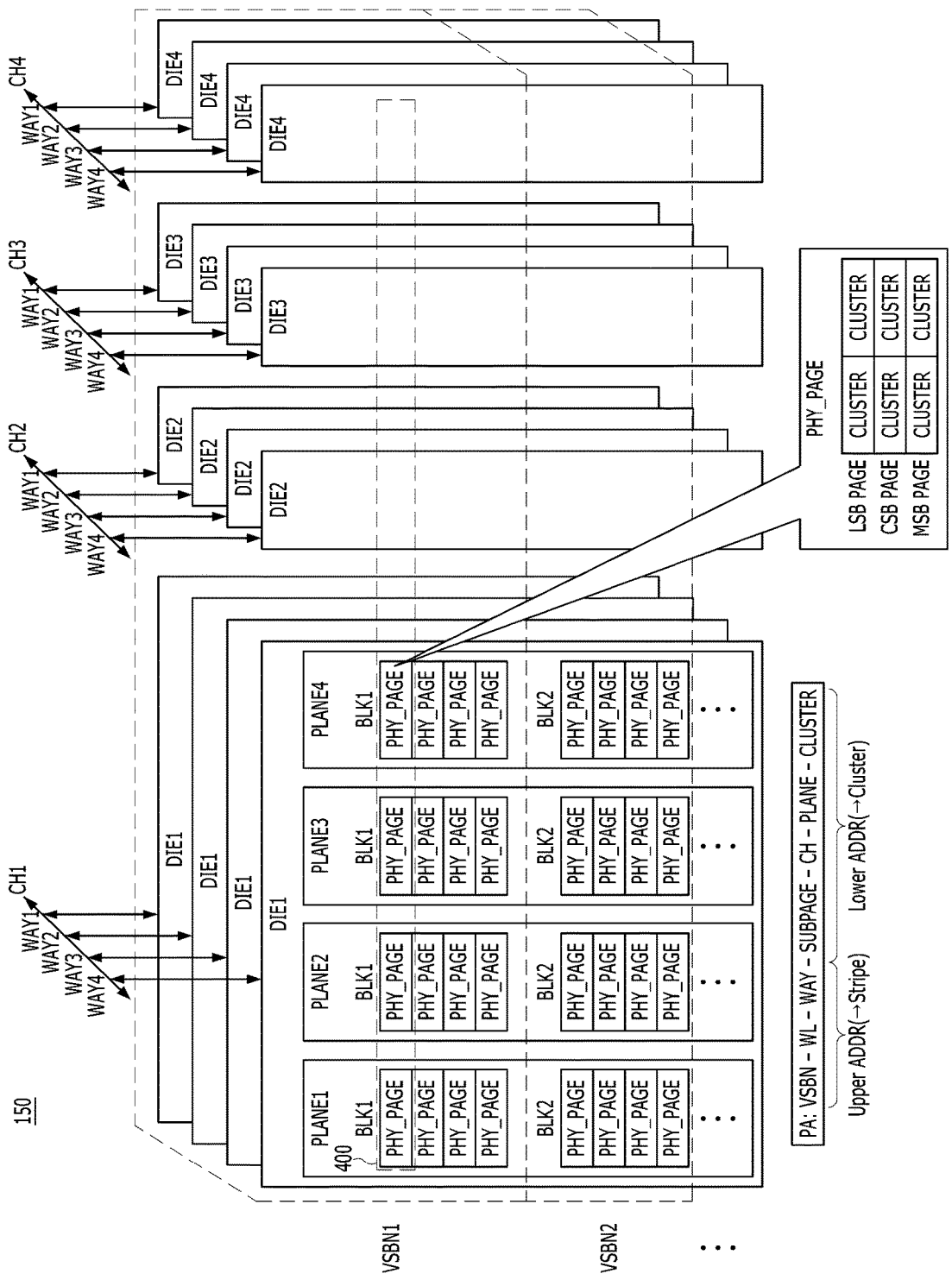
FIG. 4 illustrates an example of a hierarchical structure of a memory device.

FIG. 4 is a diagram to assist in the explanation of one embodiment of a hierarchical structure of the memory device 150. The hierarchical structure includes a plurality of memory dies DIE1 to DIE4 coupled to a plurality of channels CH1 to CH4 and a plurality of ways WAY1 to WAY4. The plurality of channels CH1 to CH4, the plurality of ways WAY1 to WAY4 and the plurality of memory dies DIE1 to DIE4 illustrated in FIG. 4 may correspond, for example, to those described with reference to FIG. 1.

Each of the plurality of memory dies DIE1 to DIE4 may include a plurality of planes. In FIG. 4, only a plurality of planes PLANE1 to PLANE4 in the first memory die DIE1 are illustrated, and a plurality of planes which may be in the second to fourth memory dies DIE2 to DIE4 are not illustrated. Each of the plurality of planes may correspond to plane 300 described with reference to FIG. 2.

Each of the plurality of planes may include a plurality of memory blocks BLK1, BLK2, . . . . Each of the plurality of memory blocks BLK1, BLK2, . . . may include a plurality of physical pages PHY_PAGE. Referring to FIG. 4, one physical page PHY_PAGE may include an MSB page, a CSB page and an LSB page as subpages. Memory cells may be erased in units of a memory block and may be accessed in units of physical page.

One subpage may include one or more clusters CLUSTER. In one embodiment, the cluster may include a memory region of a smallest unit to be accessed by the host 102. For example, the memory system 110 may be identified and accessed by the unit of 4 KB by the host 102. The host 102 may allocate a logical address to data by the unit of 4 KB.

When one subpage of the memory system 110 is capable of storing data of 8 KB, two clusters may be included in one subpage. Data which can be stored in one cluster may be referred to, for example, as a data chunk.

In order to easily interleave commands for a plurality of memory dies, controller 130 may group memory blocks which are simultaneously accessible and may handle the grouped memory blocks as a super block. For example, controller 130 may generate a super block by grouping memory blocks, each of which is one memory block of each plane in the memory device 150.

FIG. 4 illustrates an example of a first virtual super block VSBN1 in which first memory blocks BLK1 having a same identifier are grouped from all or a predetermined number of planes, and a second virtual super block VSBN2 in which second memory blocks BLK2 having a same identifier are grouped. The reason why the super blocks illustrated in FIG. 4 are referred to as virtual super blocks is because the super blocks may include virtualized memory blocks. For example, the first memory block BLK1 may indicate a first physical block having a first physical address in a plane, but, when the first physical block is a bad block, may indicate another memory block for replacing the bad block.

The controller 130 may handle pages which can be simultaneously accessed (among a plurality of physical pages in the super block) as a stripe. The controller 130 may control a program operation and a read operation of the memory device 150 in units of a stripe. For example, the controller 130 may group physical pages which can be simultaneously accessed from memory dies coupled to different channels, among a plurality of physical pages in the super block. FIG. 4 illustrates an example of a stripe 400 in which physical pages are grouped, where each physical page is one physical page of each of the planes in the first to fourth memory dies DIE1 to DIE4 coupled to the fourth way WAY4.

The controller 130 may collect data chunks to be written and arrange the data chunks in a plurality of clusters in the stripe. In one embodiment, the controller 130 may interleave one-shot program type write commands by arranging the data chunks in the plurality of clusters. An operation in which controller 130 arranges a plurality of data chunks in the plurality of clusters, so that the data chunks can be programmed in parallel, may be referred to as a striping operation. When the striping operation is completed, the controller 130 may provide write commands for the stripe to the memory device 150.

Also, in one embodiment a physical address may include an upper address and a lower address. The upper address may designate a stripe. Stripes in the memory device 150 may be identified by super block addresses-word line addresses-way addresses. For example, the stripe 400 may be identified by the addresses of VSBN1-WL1-WAY4. The lower address may designate clusters in a stripe. A plurality of clusters in the stripe may be identified by channel addresses-subpage addresses-plane addresses-cluster addresses. The controller 130 may use the lower address to designate a cluster in which each data chunk is to be stored.

Figure 5A:
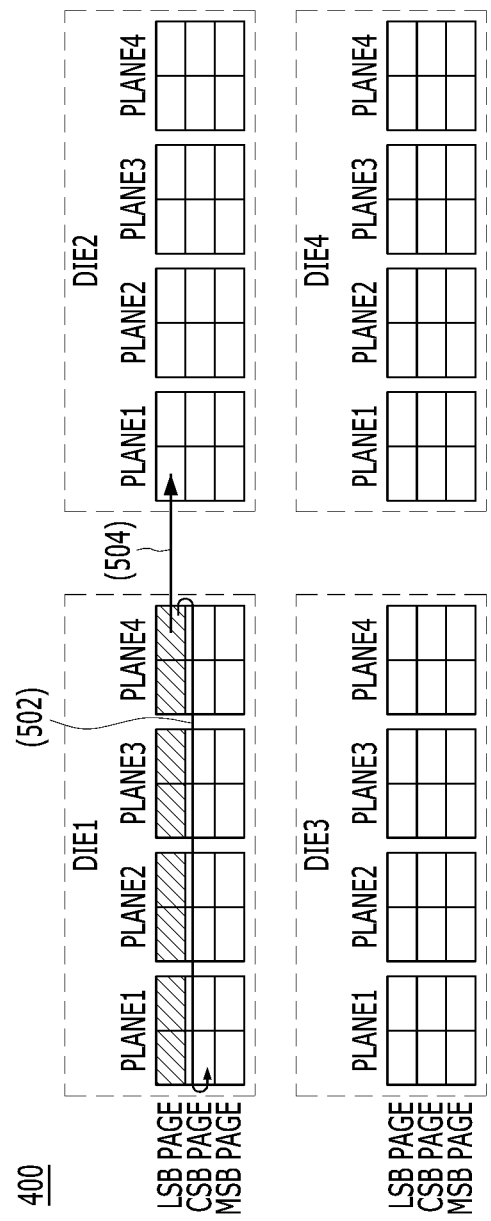
FIGS. 5A and 5B illustrate examples of a striping operation of a controller.
Figure 5B:
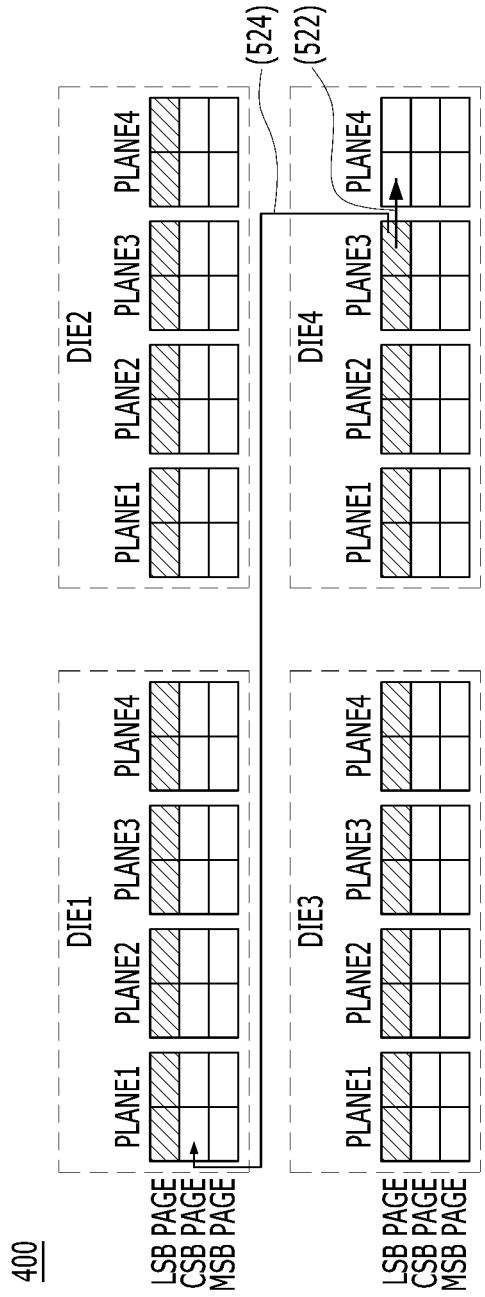
Figure 5C:
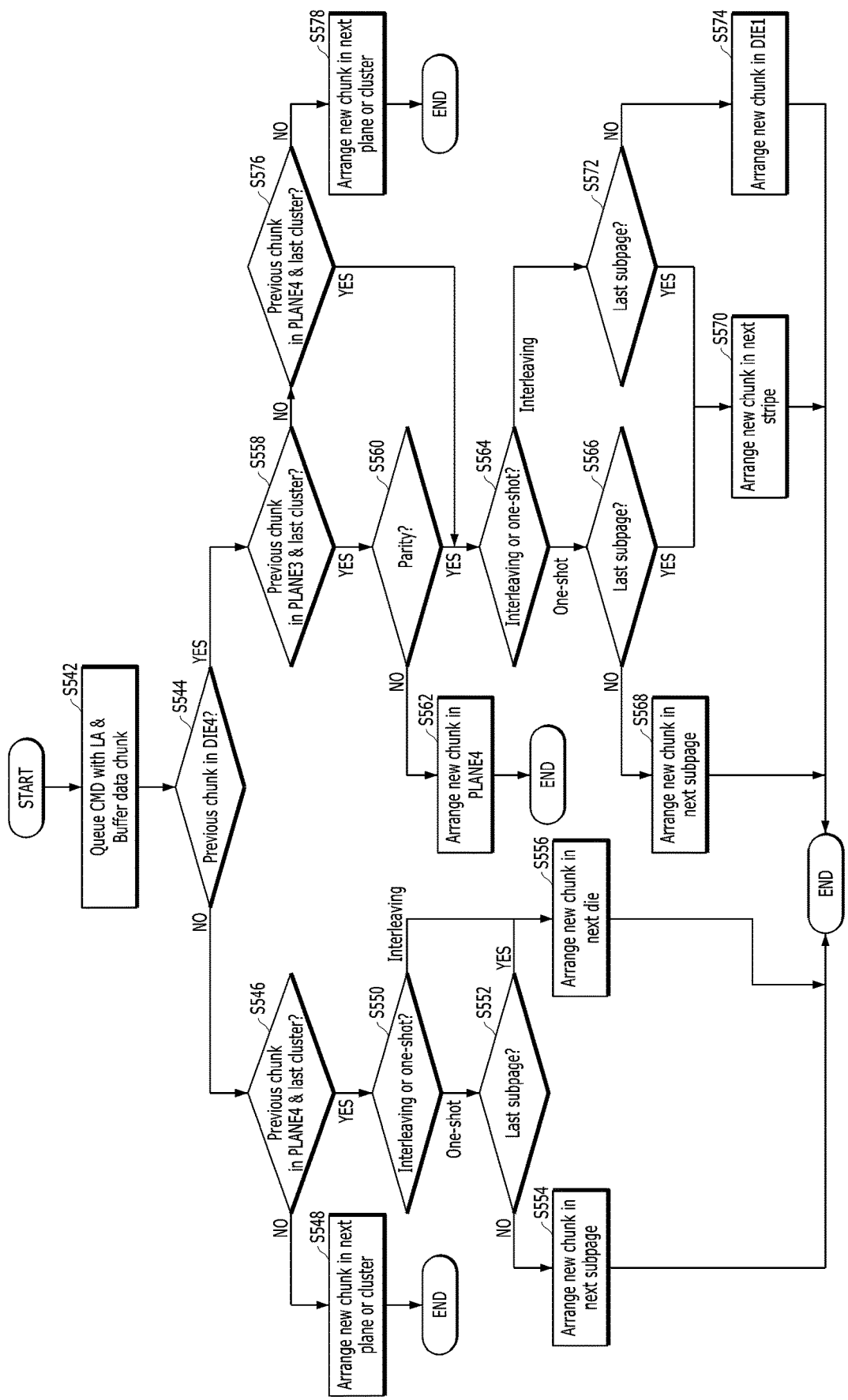
FIG. 5C illustrates one type of striping operation which has been proposed.

FIGS. 5A to 5C are diagrams to assist in the explanation of examples of a striping operation of the controller 130 in accordance with one or more embodiments.

FIG. 5A illustrates an example of one-shot-based striping scheme and an interleaving-based striping scheme. The throughput of a write operation and the throughput of a read operation of the memory system 110 may vary depending on a scheme in which the controller 130 stripes data chunks.

In FIG. 5A, one stripe 400 is shown along with a plurality of clusters in the stripe 400. In this example, a hatched cluster represents a cluster in which a data chunk is already arranged, and a cluster with no pattern represents a cluster in which no data chunk is arranged. The controller 130 may complete the arrangement of data chunks in LSB pages of the first memory die DIE1 of the stripe 400, and then may determine clusters in which data chunks to be written next are to be arranged.

Also, FIG. 5A illustrates an arrangement 502 of the next data chunks in one-shot-based striping and an arrangement 504 of the next data chunks in die interleaving-based striping. In one embodiment, a one-shot-based striping scheme may refer to a scheme of striping data chunks so that successive data chunks can be one-shot programmed. For example, the controller 130 may start to arrange the next data chunks first in the CSB pages of the first memory die DIE1. After completing the arrangement of data chunks in the first memory die DIE1, the controller 130 may arrange data chunks sequentially in the second to fourth memory dies DIE2 to DIE4.

In the case where the controller 130 uses the one-shot-based striping scheme, when the arrangement of data chunks in 24 clusters included in one memory die is completed, the controller 130 may control a one-shot program operation for the memory die. If the one-shot program operation is completed even before the arrangement of data chunks in the remaining memory dies is completed, the controller 130 may remove written data from a buffer of the controller 130. Therefore, data to be programmed may occupy a relatively small portion of the buffer. However, in order to read successively programmed data chunks, the memory die to which the data chunks are programmed may perform multiple (e.g., three) read operations for reading the LSB pages, the CSB pages and the MSB pages included therein. Since the other dies are in an idle state, throughput of a read operation may be reduced.

The interleaving-based striping scheme may include a scheme of striping data chunks so that consecutive data chunks are interleaved over a plurality of dies. For example, the controller 130 may start to arrange the next data chunks first in the LSB pages of the second memory die DIE2. After completing the arrangement of data chunks in the LSB pages of all the memory dies of the stripe 400, the controller 130 may arrange data chunks sequentially in the CSB pages and the MSB pages. In the case where the controller 130 uses the interleaving-based striping scheme, throughput of a read operation may be improved since the plurality of memory dies may simultaneously perform the read operation when successively programmed data are read. However, data to be programmed may occupy a relatively large portion of the buffer.

The controller 130 may select any one of a plurality of striping schemes depending on the type of data to be written. For example, the controller 130 may perform one-shot-based striping to write host data and may perform interleaving-based striping to write garbage collection data.

FIG. 5B is a diagram illustrating an example of whether to skip a certain memory region based on storage of a parity chunk. In order to store a parity chunk related with data chunks, in some clusters the controller 130 may skip the arrangement of data chunks in some memory regions in a certain stripe.

In order to ensure reliability of data stored in the memory device 150, the controller 130 may store a parity chunk for data chunks (stored in a plurality of clusters) in another cluster. For example, the controller 130 may perform a chipkill operation of storing a parity chunk in a cluster, which chipkill operation may be initiated by performing a logical (e.g., XOR) operation on a plurality of data chunks. When an uncorrectable error occurs in any one of the plurality of data chunks, the data chunk in which the uncorrectable error has occurred may be recovered by performing a logical (e.g., XOR) operation on the remaining data chunks and the parity chunk.

The controller 130 may generate a parity chunk of data chunks stored in one or more stripes, and may store the parity chunk in a predetermined region of any one stripe among the stripes. For example, the predetermined region may be clusters in the fourth plane PLANE4 of the fourth memory die DIE4 among the clusters in the any one stripe.

FIG. 5B shows an example of the arrangement of next data chunks after the arrangement of data in the third plane PLANE3 of the fourth memory die DIE4 of the stripe 400 is completed. When the stripe 400 does not store a parity chunk, the controller 130 may arrange data chunks in the fourth plane PLANE4. A case where the controller 130 arranges data chunks in the fourth plane PLANE4 is illustrated as a next data chunk arrangement 522.

When the stripe 400 stores a parity chunk in the fourth plane PLANE4, the controller 130 may skip the fourth plane PLANE4 and may arrange data chunks in a die or subpage of a next order. A case where the controller 130 skips the fourth plane PLANE4 is illustrated as a next data chunk arrangement 524.

In some methods which have been proposed, a large amount of calculations are performed in order to allow a controller to arrange each data chunk in a cluster. Each time the controller arranges one data chunk, the controller considers all of a cluster in which a previous data chunk is arranged, a striping scheme of the data chunk and whether a parity chunk is to be stored.

FIG. 5C is a diagram of an example to assist in the explanation of a data chunk arrangement method according to the aforementioned proposed method. In this method, the controller may correspond to controller 130 for illustrative purposes only.

At operation S542, the controller 130 may queue a command for a new data chunk and buffer the data chunk. The controller 130 may determine a cluster in which the new data chunk is to be arranged, depending on a cluster in which a previous data chunk is arranged.

At operation S544, the controller 130 may determine whether the previous data chunk is arranged in a cluster of the fourth memory die DIE4. When the previous data chunk is not arranged in the cluster of the fourth memory die DIE4, the cluster in which the new data chunk is to be arranged may be determined in consideration of a position of the previous data chunk and a striping scheme of the current data chunk (S546 to S556). When the previous data chunk is arranged in the cluster of the fourth memory die DIE4, the cluster in which the new data chunk is to be arranged may be determined in consideration of a position of the previous data chunk, a striping scheme of the current data chunk and whether a parity chunk is to be stored or not (S558 to S574).

At operation S546, the controller 130 may determine whether the previous data chunk is arranged in a last cluster of a page included in the fourth plane PLANE4. When the previous data chunk is arranged in the last cluster of the fourth plane PLANE4, the controller 130 may consider, at operation S550, whether a striping scheme of the current data chunk is an interleaving-based scheme or a one-shot-based scheme. At operation S552, the controller 130 may consider whether the previous data chunk is arranged in a last subpage. Based on the result, the controller 130 may arrange the new data chunk in a next subpage (S554) or arrange the new data chunk in a next memory die (S556).

At operation S548, when the previous data chunk is not arranged in the last cluster of the fourth plane PLANE4, the controller 130 may arrange the new data chunk in a cluster or plane next to the previous data chunk.

At operation S558, the controller 130 may determine whether the previous data chunk is arranged in a last cluster of a page included in the third plane PLANE3.

At operation S560, when the previous data chunk is arranged in the third plane PLANE3, the controller 130 may determine whether to store a parity chunk in the fourth plane PLANE4.

At operation 562, when a parity chunk is not stored in the fourth plane PLANE4, the controller 130 may arrange the new data chunk in the fourth plane PLANE4.

At operation S564, when a parity chunk is stored in the fourth plane PLANE4, the controller 130 may consider whether a striping scheme of the current data chunk is an interleaving-based scheme or a one-shot-based scheme.

At operation S566 and operation S572, the controller 130 may consider whether the previous data chunk is arranged in a last subpage. Based on the result, the controller 130 may arrange the next data chunk in a next subpage (S568), in a next stripe (S570), or in the first memory die DIE1 (S574).

When the previous data chunk is arranged in the fourth plane PLANE4, the controller 130 may exclude a case where a parity chunk is arranged in the fourth plane PLANE4, and may determine a position of the next data chunk by performing operations S564 to S574.

At operation S578, when the previous data chunk is arranged in the first or second plane PLANE1 or PLANE2, the controller 130 may arrange the new data chunk in a cluster or plane next to the previous data chunk.

Although not shown in FIG. 5C, there may be a case where dummy data needs to be stored in clusters in which data chunks are not arranged and the stripe needs to be programmed to the memory device 150. This may occur as the controller 130 receives a host flush command, and even when all data chunks are not striped in a stripe. Also, in order to determine a position for storing dummy data, the controller 130 considers all of the arrangement of the previous data chunk, a striping scheme of the current data chunk, and whether a parity chunk is to be stored.

When a large amount of calculations are performed for the controller 130 to stripe each of data chunks, a time for a write operation of the memory system 110 may increase. Therefore, the controller 130 will perform striping with a small amount of calculations so as to improve the write performance of the memory system 110.

According to an embodiment of the disclosure, the controller 130 may store a lookup table for determining a cluster in which a data chunk is to be arranged, among clusters included in a stripe. For example, the controller 130 may count a queued order of a write command and determine a cluster in which a data chunk corresponding to the write command is to be arranged based on the lookup table and the queued order. Also, in one embodiment, the controller 130 may store a plurality of lookup tables which are different from one another depending, for example, on a striping scheme of a data chunk and whether a parity chunk is to be stored.

When one of the plurality of lookup tables is selected, the controller 130 may determine a cluster in which a data chunk is to be arranged by counting only a queued order of a write command. Since the controller 130 need not perform calculations for various cases that vary depending on the address of a cluster in which a previous data chunk is arranged (in order to determine a cluster in which a data chunk is to be arranged), the time for a write operation of the memory system 110 may be decreased.

Figure 6:
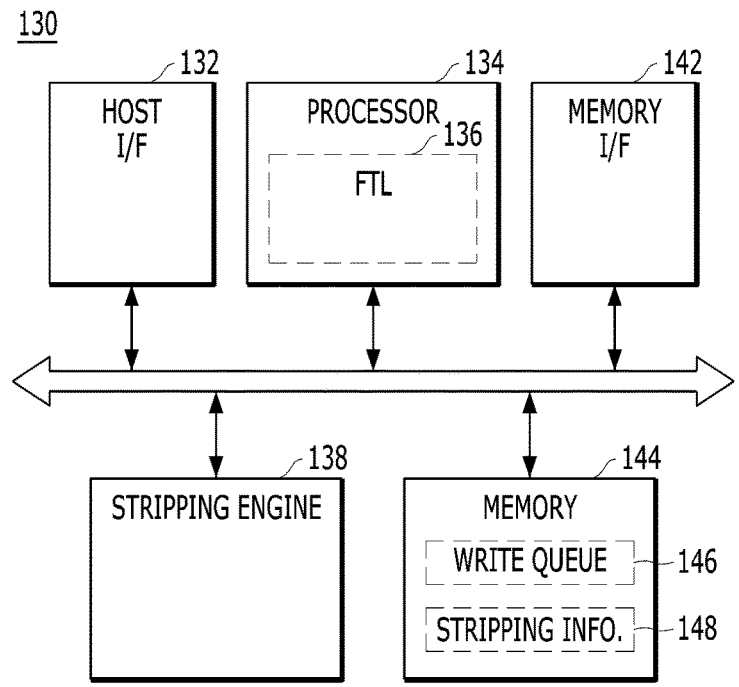
FIG. 6 illustrates an embodiment of a controller.

FIG. 6 is a diagram illustrating an embodiment of a structure of the controller 130 which may include a host interface (I/F) 132, a processor 134, a memory I/F 142, and a memory 144 all operatively coupled via an internal bus.

Referring to FIG. 6, the host I/F 132 may be configured to process a command and data of the host 102 and may communicate with the host 102 through one or more of interface protocols. Examples include universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE). The host I/F 132 may be driven using instructions (e.g., firmware that may be referred to as a host interface layer (HIL)) in order to exchange data with the host.

The memory I/F 142 may serve as a memory/storage interface for interfacing the controller 130 and the memory device 150, in order to allow the controller 130 to control the memory device 150 in response to a request from the host 102. When the memory device 150 is a flash memory (e.g., a NAND flash memory), the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. For example, memory I/F 142 may support data transfer between the controller 130 and the memory device 150.

The memory I/F 142 may be driven through firmware referred to as a flash interface layer (FIL) in order to exchange data with the memory device 150.

The processor 134 may control overall operations of the memory system 110 by driving instructions (e.g., firmware). The firmware may be, for example, a flash translation layer (FTL) 136. The processor 134 may be, for example, a microprocessor or a central processing unit (CPU). The processor 134 may drive the FTL 136 and perform a foreground operation corresponding to a request received from the host. For example, the processor 134 may control a write operation of the memory device 150 in response to a write request from the host and control a read operation of the memory device 150 in response to a read request from the host.

The controller 130 may perform a background operation onto the memory device 150 through the processor 134, e.g., microprocessor or CPU. For example, the background operation performed onto the memory device 150 may include a garbage collection (GC) operation, a wear-leveling (WL) operation, a map flush operation, or a bad block management operation.

The memory 144 may serve as a working memory of the memory system 110 and the controller 130, and may store data for driving the memory system 110 and the controller 130. The controller 130 may control the memory device 150 to perform read, program and erase operations in response to a request from the host 102. The controller 130 may provide data read from the memory device 150 to the host 102 and store data from the host 102 to the memory device 150. The memory 144 may store data for the controller 130 and the memory device 150 in order to perform these operations.

The memory 144 may be embodied by a volatile memory, e.g., a static random access memory (SRAM) or dynamic random access memory (DRAM). The memory 144 may be within or outside of the controller 130. FIG. 6 exemplifies memory 144 as being within the controller 130. In an embodiment, the memory 144 may be embodied by an external volatile memory having a memory interface transferring data between the memory 144 and the controller 130.

Also, memory 144 may store a write queue 146 for queuing a write request and striping information 148 for striping the queued write request. The striping information 148 may include at least one lookup table which indicates addresses of clusters according to an order of striping data chunks. The memory 144 may further include a buffer for buffering data corresponding to the write request.

In response to a request of a processor 134, a striping engine 138 may arrange a data chunk to be written in a cluster of a stripe. The striping engine 138 may refer to the striping information 148 in order to arrange the data chunk in a cluster.

Figure 7:
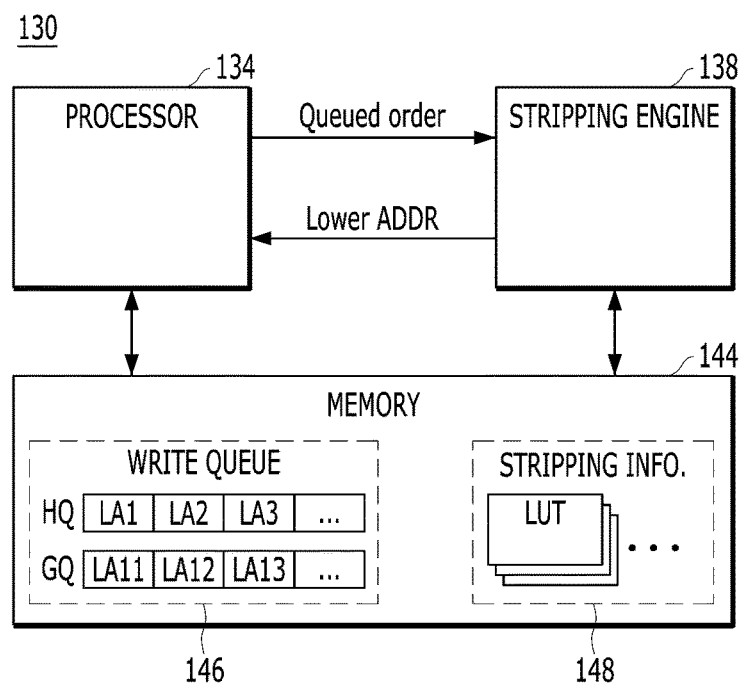
FIG. 7 illustrates an embodiment of a method of arranging data chunks in clusters.

FIG. 7 is a diagram to assist in the explanation of an embodiment of a method for arranging data chunks in clusters. In FIG. 7, a processor 134, a striping engine 138 and a memory 144 of the controller 130 are shown. The processor 134, the striping engine 138 and the memory 144 may correspond, for example, to those described with reference to FIG. 6.

A write command may be queued in a write queue 146 and may include a host write command received from the host 102 and an internal write command which is generated in the controller 130. An example of the internal write command is a GC (garbage collection) write command which may accompany a garbage collection operation of processor 134.

Also, FIG. 7 illustrates a host queue HQ and a GC queue GQ in which the host write command and the GC write command are queued, respectively. When receiving a write command from the host 102, the host interface 132 may slice the write command into a plurality of host write commands depending on the size of data related with the write command, and may queue the sliced host write commands in the host queue HQ. Each of the sliced host write commands may be, for example, a write command for one data chunk and may be related with one logical address. Also, FIG. 7 illustrates logical addresses LA1, LA2 and LA3 related with host write commands, respectively, queued in the host queue HQ.

The processor 134 may queue a GC write command in the GC queue GQ. Like the host write command, the GC write command may be a write command for one data chunk and may be related with one logical address. FIG. 7 illustrates logical addresses LA11, LA12 and LA13 related with GC write commands, respectively, queued in the GC queue GQ.

The processor 134 may select a stripe in which host data chunks corresponding to host write commands queued in the host queue HQ are to be stored. In order to determine a cluster of the selected stripe in which a data chunk related with the host write command is to be arranged, the processor 134 may provide to the striping engine 138 information on the queued order in which the host write command is queued in the write queue 146. The aforementioned determination may be made, for example, depending on an order in which a host write command is queued in the host queue HQ.

The cluster of the stripe in which the data chunk is to be arranged may be identified by a predetermined (e.g., lower) address of the physical address described with reference to FIG. 4. For example, the striping engine 138 may determine a lower address of the host data chunk based on the queued order information obtained from the processor 134 and then may provide the determined lower address to processor 134. The processor 134 may determine a physical address of the host data chunk based on the lower address and an upper address which designates the determined stripe. In one embodiment, the cluster of the stripe in which the data chunk is to be arranged may be identified by another address or portion of the physical address that is different from the lower address.

In one embodiment, the processor 134 may determine a stripe in which the GC data chunks are to be stored even in the case where GC data chunks corresponding to GC write commands are queued in the GC queue GQ. The processor 134 may obtain a lower address of the GC data chunk by providing queued order information to the striping engine 138. The processor 134 may determine a physical address of the GC data chunk based on the lower address and an upper address which designates the determined stripe.

The processor 134 may generate map data by mapping the logical address of the data chunk (from the host 102) and the determined physical address. The processor 134 may update the generated map data to the memory 144.

When the striping information 148 includes a plurality of lookup tables, the striping engine 138 may select one of the lookup tables and may determine a lower address of a data chunk by referring to the selected lookup table. The processor 134 may provide striping mode information to the striping engine 138 so that the striping engine 138 may select a lookup table. For example, the processor 134 may select a striping mode based on a type of a data chunk to be striped and whether a parity chunk is to be inserted into a stripe. The striping engine 138 may select a lookup table based on the striping mode.

According to an example implementation, striping engine 138 may be implemented by a dedicated hardware circuit. When the hardware-based striping engine 138 performs striping of data chunks, it is possible to offload an address mapping operation of the processor 134.

By way of comparison, if the calculations described above with reference to the proposed approach of FIG. 5C are performed by a hardware-based striping engine 138, the number of logic gates for the hardware may increase, thereby increasing the circuit area of the memory system 110. Further, in order to determine a lower address of a data chunk, the striping engine 138 needs to determine a striping scheme and perform the calculation described with reference to FIG. 5C based on the determined striping scheme and a lower address of a previously arranged data chunk. Therefore, the amount of power consumption of the memory system 110 may increase. In addition, if the striping engine 138 is implemented by hardware, it is difficult to change a fixed striping policy.

According to an embodiment, the striping engine 138 may be implemented by a hardware circuit capable of performing a calculation of selecting any one among a plurality of lookup tables based on striping mode information from the processor 134, and a calculation of outputting a lower address according to queued order information from the processor 134 by referring to the selected lookup table. When the striping engine 138 outputs a lower address by referring to a lookup table stored in the memory 144, the number of logic gates for implementing the striping engine 138 may decrease. Also, the amount of power consumption of the memory system 110 may decrease. Moreover, a striping policy may be changed in a flexible and efficient manner by changing the lookup table(s) stored in the memory 144.

FIGS. 8A to 12B illustrate embodiments of lookup tables corresponding to various striping modes. In one or more of these embodiments, a striping method may be determined depending on a memory cell level of a stripe, a striping scheme and whether a parity chunk is to be inserted.

Figure 8A:
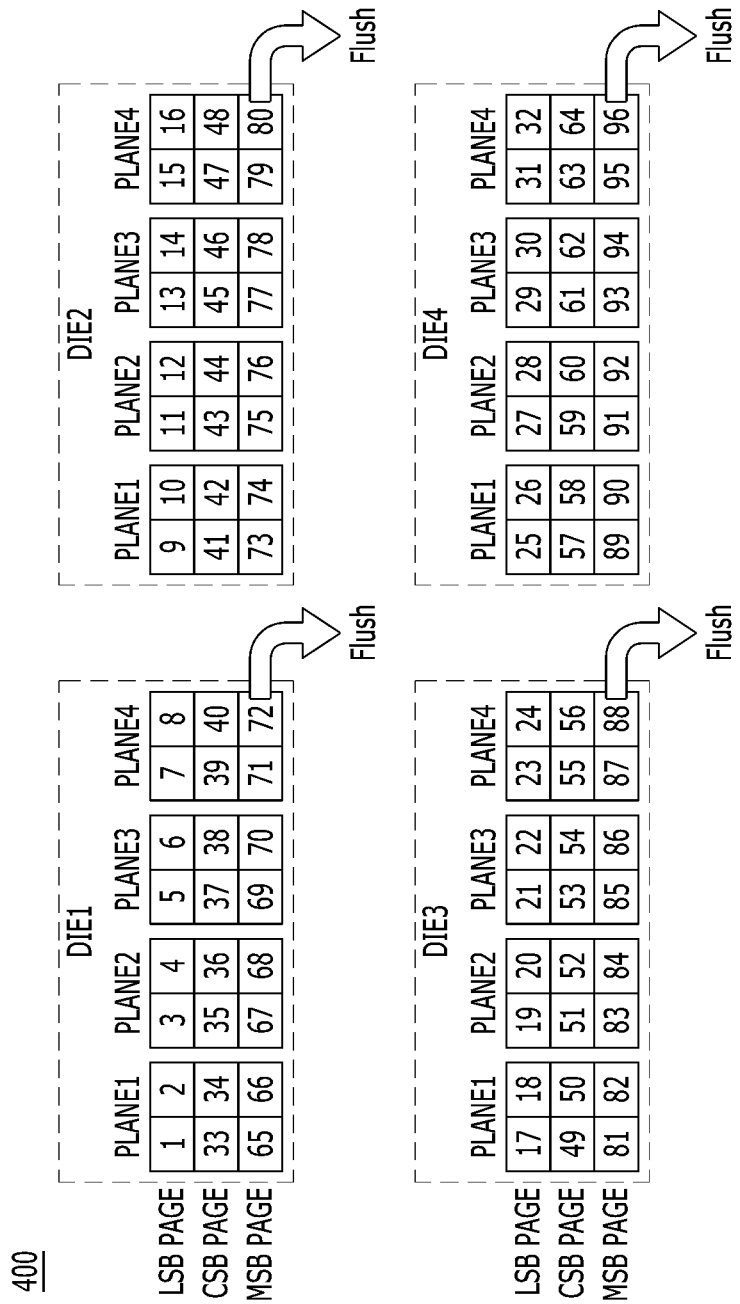

FIGS. 8A and 8B illustrate a first striping mode and a first lookup table 800 according to an embodiment. FIG. 8A illustrates orders in which data chunks are arranged in clusters in one stripe 400 in a first striping mode. The first striping mode may be selected, for example, when a triple-level cell stripe is striped by the interleaving-based striping scheme and a parity chunk is not inserted into the stripe.

Successive data chunks may be sequentially arranged in clusters of the stripe 400 which have the same subpage address. When data chunks are arranged in the clusters, data chunks may be arranged in clusters which have a next subpage address. Since a parity chunk is not inserted, data chunks may be arranged up to the fourth plane PLANE4 of the fourth memory die DIE4. In the example of FIG. 8A, first to 32nd data chunks may be first arranged in LSB pages, 33rd to 64th data chunks may be arranged in CSB pages, and 65th to 96th data chunks may be arranged in MSB pages.

When the arrangement of data chunks in clusters in one memory die of the stripe 400 is completed, the processor 134 may control the memory die to perform a one-shot program operation for the clusters. In the example of FIG. 8A, when the arrangement of the 72nd data chunk is completed, data chunks may be flushed to the first memory die DIE1. Similarly, when the arrangement of the 80th, 88th and 96th data chunks is completed, data chunks may be flushed to the second, third and fourth memory dies DIE2, DIE3 and DIE4. When the program operation of the memory die is completed, related write commands may be removed from the write queue 146.

FIG. 8B illustrates the first lookup table 800 corresponding to the first striping mode according to an embodiment. The first lookup table 800 represents a lower address according to a queued order of a data chunk in the first striping mode. The lower address may be identified by three subpage addresses, four channel addresses, four plane addresses and two cluster addresses.

As a queued order increases in the first lookup table 800, a cluster address corresponding to the queued order may increase. When the cluster address is initialized after reaching a maximum value, a plane address may increase. A memory die address corresponding to the queued order may increase when the plane address is initialized after reaching a maximum value, and a subpage address corresponding to the queued order may increase when the memory die address is initialized after reaching a maximum value.

When receiving first striping mode information and a queued order of a data chunk from the processor 134, the striping engine 138 may determine a lower address of the data chunk by referring to the first lookup table 800, and may provide the lower address to the processor 134. For example, referring to FIG. 8A, the 25th data chunk may be arranged in the first cluster of the LSB page of the first plane PLANE1 of the fourth memory die DIE4. When the striping engine 138 operates in the first striping mode, if a queued order '25' of a data chunk is received from the processor 134, the striping engine 138 may provide a lower address including SUBPAGE=1, CH=4, PLANE=1 and CLUSTER=1 to the processor 134 by referring to the first lookup table 800.

When a queued order received from the processor 134 is a last queued order of the first lookup table 800, the striping engine 138 may notify the processor 134 that the queued order is the last queued order, while providing a lower address, corresponding to the queued order, to the processor 134. For example, when receiving a queued order '96' of a data chunk from the processor 134, the striping engine 138 may notify the processor 134 that the corresponding queued order is the last queued order, while providing a lower address including SUBPAGE=3, CH=4, PLANE=4 and CLUSTER=2 to the processor 134 by referring to the first lookup table 800. The processor 134 may initialize queued orders in response to the notification, and may update an upper address so that data chunks may be arranged in a next stripe.

According to an implementation example, a subpage address may be expressed as 2-bit data in the first lookup table 800. SUBPAGE=1 may designate an LSB page, SUBPAGE=2 may designate a CSB page, and SUBPAGE=3 may designate an MSB page. In order to clearly distinguish an upper address and a lower address in a physical address expressed by a binary number, a subpage address corresponding to SUBPAGE=4 may not be used and may be skipped.

Figure 9A:
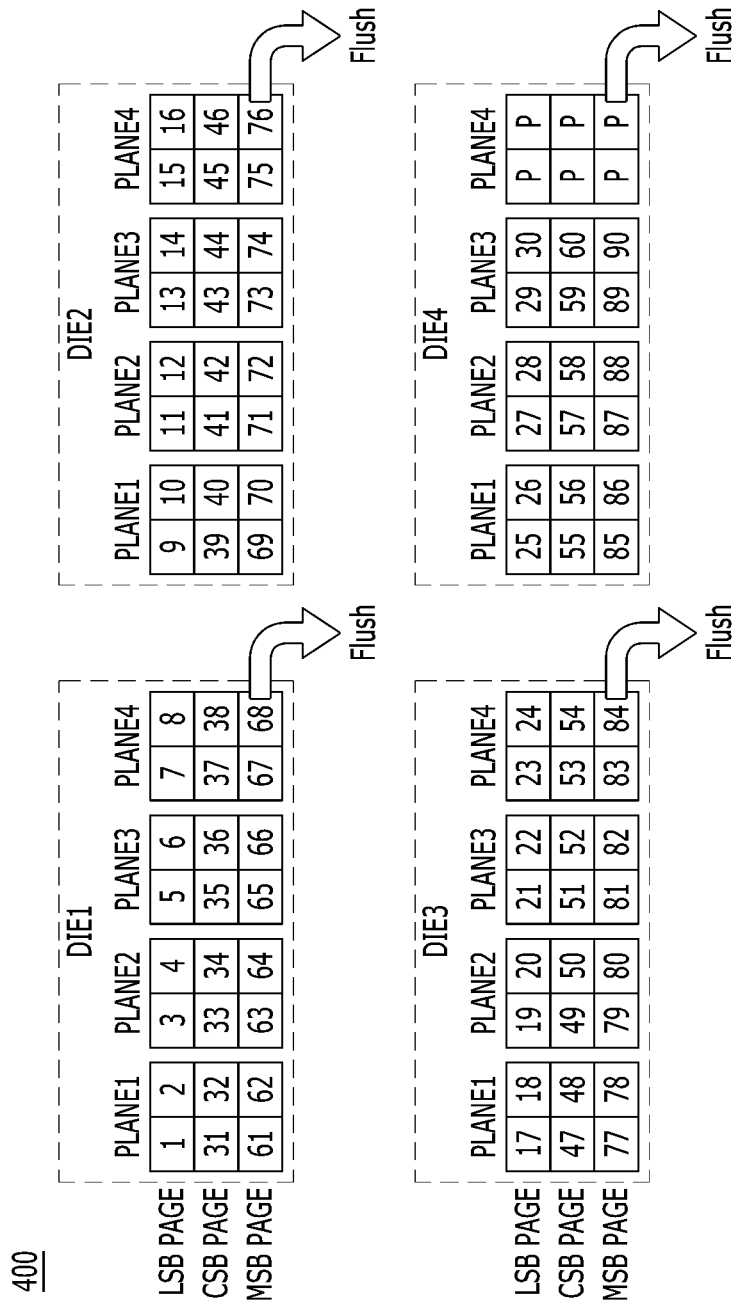

FIGS. 9A and 9B illustrate a second striping mode and a second lookup table 900 according to an embodiment. FIG. 9A illustrates orders in which data chunks are arranged in clusters in one stripe 400 in the second striping mode. The second striping mode may be selected, for example, when a triple-level cell stripe is striped by the interleaving-based striping scheme and a parity chunk is inserted into the stripe.

The arrangement of data chunks may be skipped in clusters predetermined to insert parity chunks, for example, clusters in the fourth plane PLANE4 of the fourth memory die DIE4. Successive data chunks may be arranged in clusters except the predetermined clusters among clusters having the same subpage address.

In the example of FIG. 9A, first to 30th data chunks may be first arranged in LSB pages, 31st to 60th data chunks may be arranged in CSB pages, and 61st to 90th data chunks may be arranged in MSB pages.

In the example of FIG. 9A, when the arrangement of the 68th data chunk is completed, data chunks may be flushed to the first memory die DIE1. Similarly, when the arrangement of the 76th and 84th data chunks is completed, data chunks may be flushed to the second and third memory dies DIE2 and DIE3.

When the arrangement of the 90th data chunk is completed, the processor 134 may generate parity chunks by performing logic calculations on data chunks arranged in the stripe and previously striped data chunks, and may arrange the parity chunks in the fourth plane PLANE4 of the fourth memory die DIE4. For example, the processor 134 may generate a parity chunk by performing a logical (e.g., XOR) calculation on data chunks corresponding to first clusters of LSB pages among data chunks in stripes, and may arrange the generated parity chunk in the first cluster of the LSB page of the fourth plane PLANE4 of the fourth memory die DIE4. When the arrangement of data chunks is completed, data chunks and parity chunks may be flushed to the fourth memory die DIE4.

FIG. 9B illustrates the second lookup table 900 corresponding to the second striping mode according to an embodiment. The second lookup table 900 represents a lower address according to a queued order of a data chunk in the second striping mode. The lower address may be identified by three subpage addresses, four channel addresses, four plane addresses and two cluster addresses. As a queued order increases in the second lookup table 900, a cluster address, a plane address, a memory die address and a subpage address may increase similarly to the first lookup table 800. However, in the second lookup table 900, clusters for storing parity chunks, included in the fourth plane PLANE4 of the fourth memory die DIE4, may be skipped.

Figure 10A:
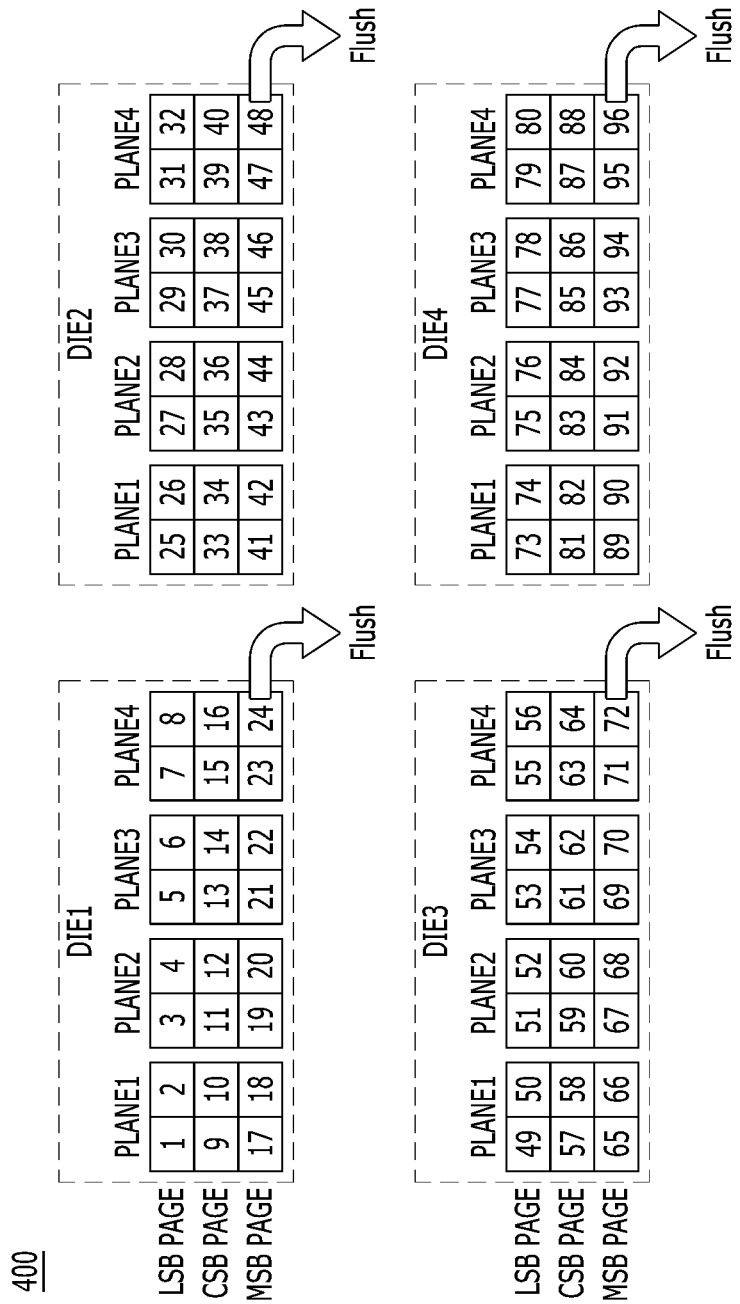
Figure 10B:
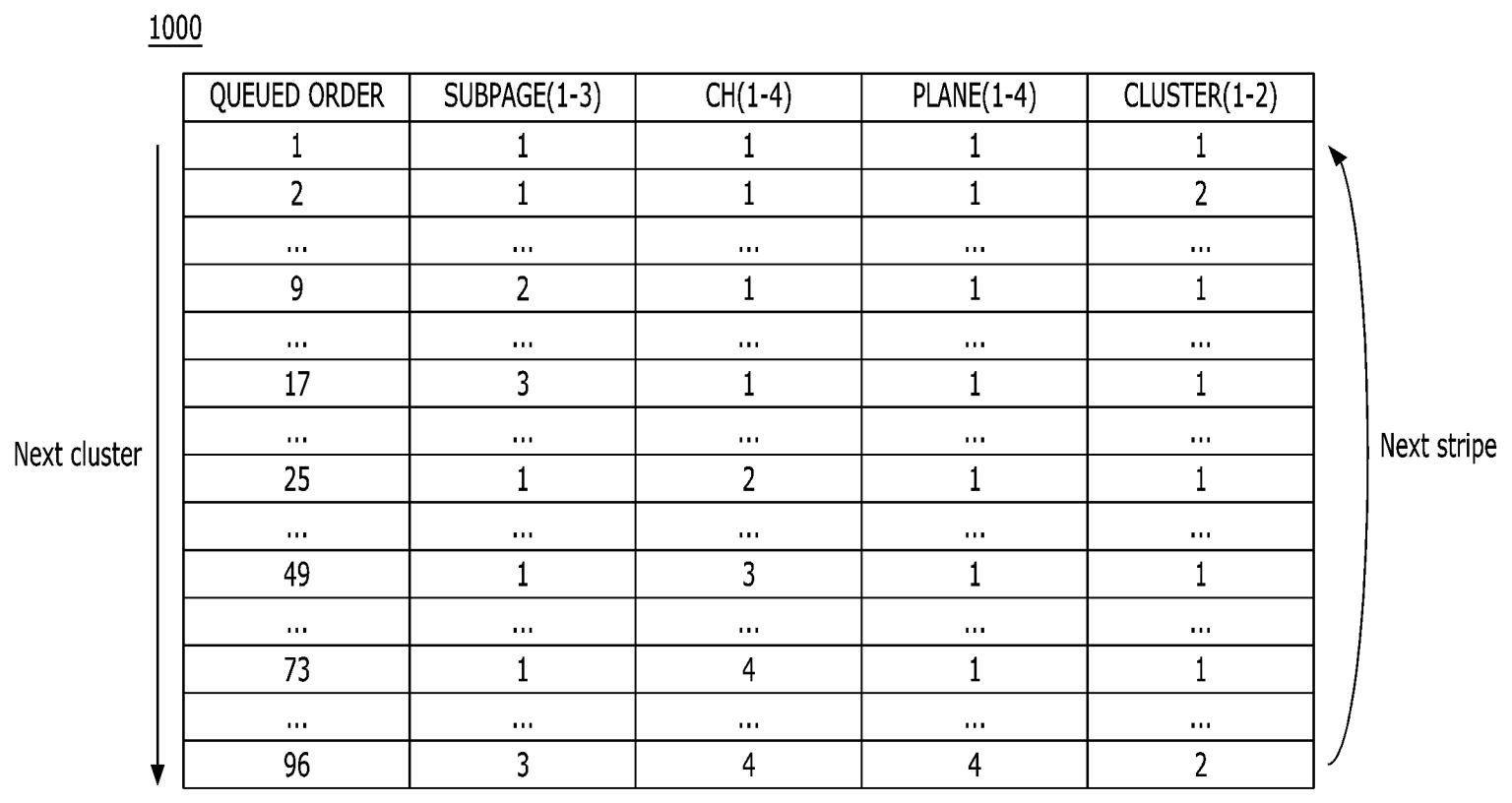

FIGS. 10A and 10B illustrate a third striping mode and a third lookup table 1000 according to an embodiment. FIG. 10A illustrates orders in which data chunks are arranged in clusters in one stripe 400 in the third striping mode. The third striping mode may be selected when, for example, a triple-level cell stripe is striped by the one-shot-based striping scheme and a parity chunk is not inserted into the stripe.

Successive data chunks may be sequentially arranged in clusters in one memory die, among the clusters of the stripe 400. When data chunks are arranged in the clusters, data chunks may be arranged in clusters in a next memory die. In the example of FIG. 10A, first to 24th data chunks may be first arranged in the first memory die DIE1. When the arrangement of the 24th data chunk is completed, data chunks may be flushed to the first memory die DIE1. Similarly, 25th to 48th data chunks may be arranged in the second memory die DIE2, 49th to 72nd data chunks may be arranged in the third memory die DIE3, and 73rd to 96th data chunks may be arranged in the fourth memory die DIE4. When the arrangement of the respective 48th, 72nd and 96th data chunks is completed, data chunks may be flushed to the second, third and fourth memory dies DIE2, DIE3 and DIE4. When the program operation of the memory die is completed, related write commands may be removed from the write queue 146.

FIG. 10B illustrates the third lookup table 1000 corresponding to the third striping mode according to an embodiment. The third lookup table 1000 represents a lower address according to a queued order of a data chunk in the third striping mode. The lower address may be identified by three subpage addresses, four channel addresses, four plane addresses and two cluster addresses.

As a queued order increases in the third lookup table 1000, a cluster address corresponding to the queued order may increase. When the cluster address is initialized after reaching a maximum value, a plane address may increase. A subpage address corresponding to the queued order may increase when the plane address is initialized after reaching a maximum value, and a memory die address corresponding to the queued order may increase when the subpage address is initialized after reaching a maximum value.

Figure 11A:
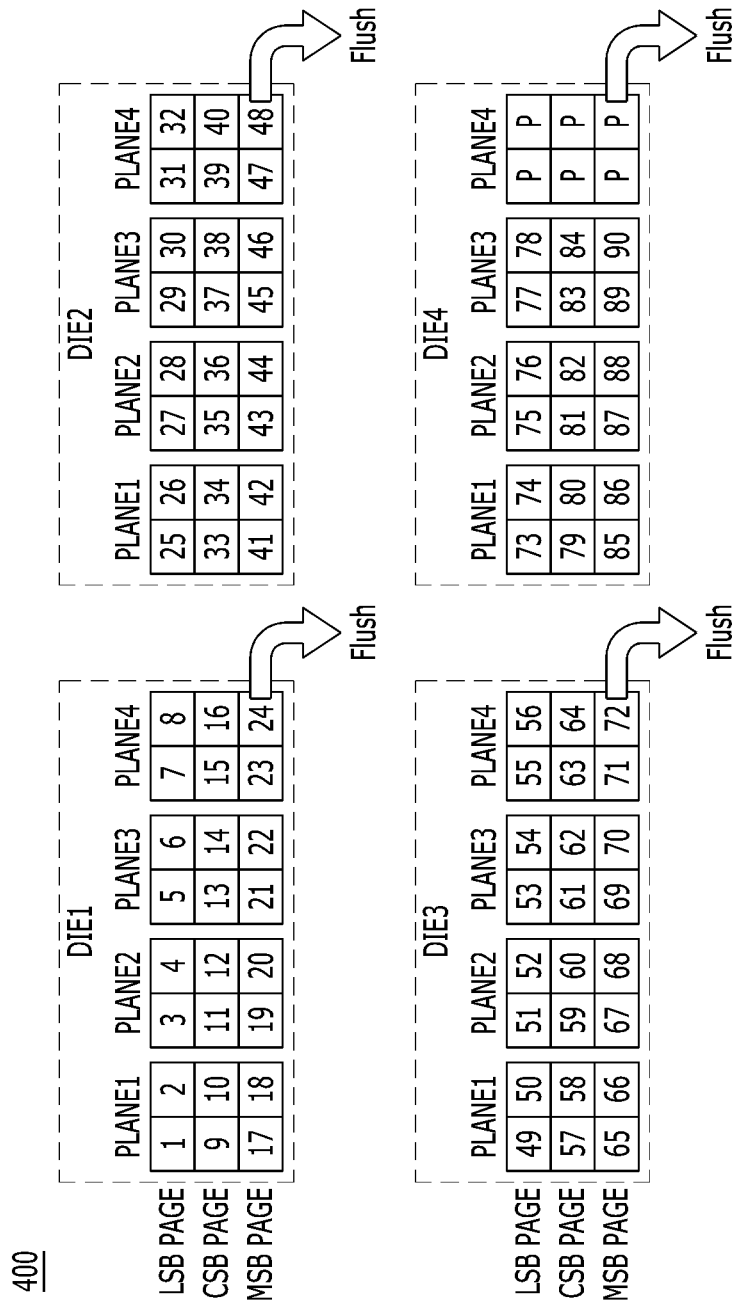
Figure 11B:
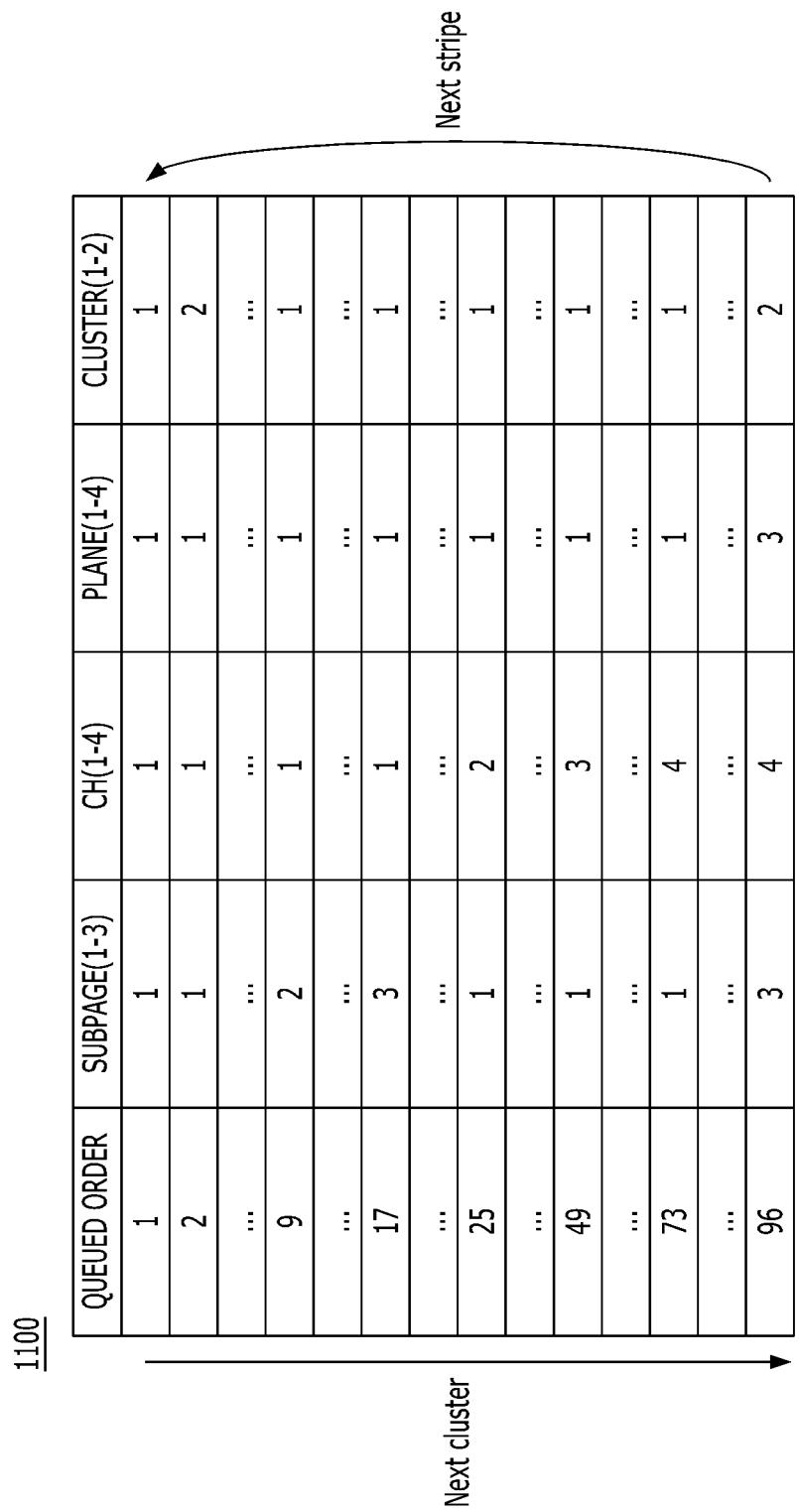

FIGS. 11A and 11B illustrate a fourth striping mode and a fourth lookup table 1100 according to an embodiment. FIG. 11A illustrates orders in which data chunks are arranged in clusters in one stripe 400 in the fourth striping mode. The fourth striping mode may be selected when, for example, a triple-level cell stripe is striped by the one-shot-based striping scheme and a parity chunk is inserted into the stripe.

The arrangement of data chunks may be skipped in clusters predetermined to insert parity chunks, e.g., clusters in the fourth plane PLANE4 of the fourth memory die DIE4. Successive data chunks may be arranged in clusters except the predetermined clusters among clusters in the same memory die.

When the arrangement of the 90th data chunk is completed, the processor 134 may generate parity chunks by performing logic calculations on data chunks arranged in the stripe and previously striped data chunks, and may arrange the parity chunks in the fourth plane PLANE4 of the fourth memory die DIE4.

FIG. 11B illustrates the fourth lookup table 1100 corresponding to the fourth striping mode according to an embodiment. The fourth lookup table 1100 represents a lower address according to a queued order of a data chunk in the fourth striping mode. The lower address may be identified by three subpage addresses, four channel addresses, four plane addresses and two cluster addresses. Lower addresses according to queued orders of the fourth lookup table 1100 may be the same as lower addresses according to queued orders of the first to 90th data chunks of the third lookup table 1000. However, clusters for storing parity chunks in the fourth lookup table 1100 may be skipped.

Figure 12A:
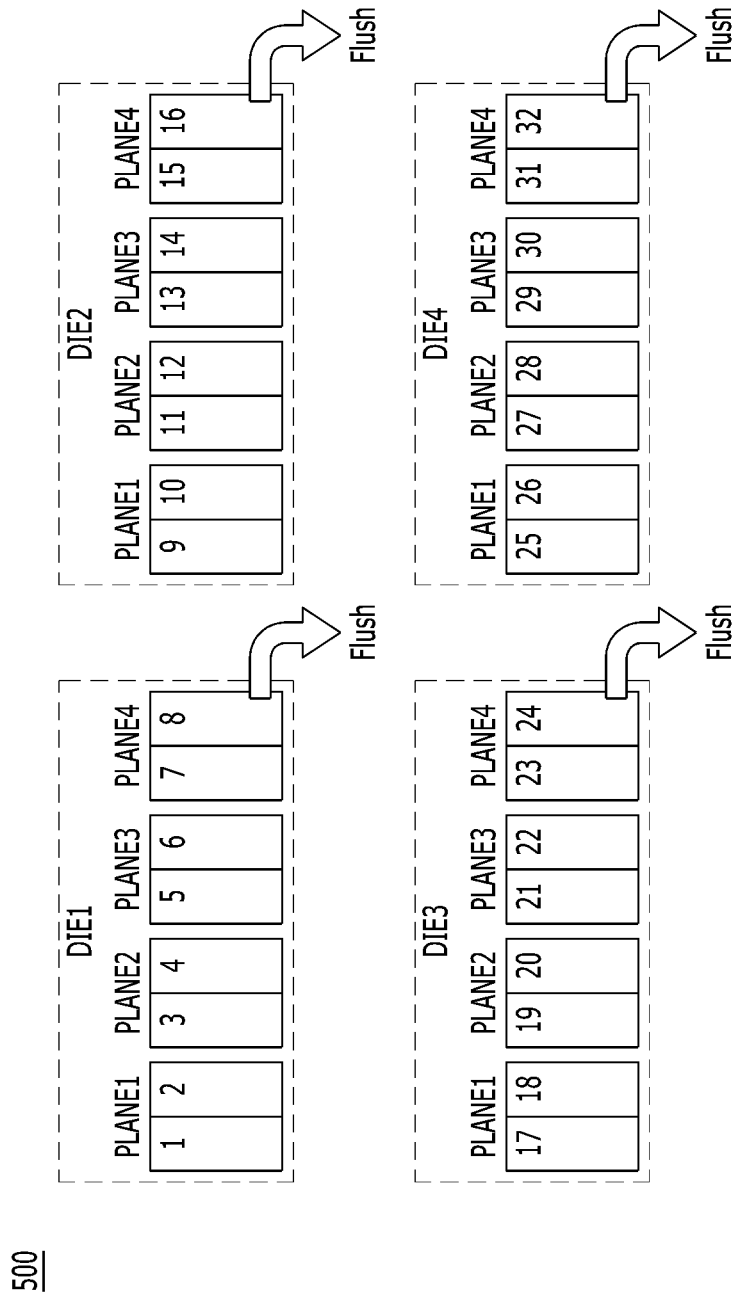

FIGS. 12A and 12B illustrate a fifth striping mode and a fifth lookup table 1200 according to an embodiment. FIG. 12A illustrates orders in which data chunks are arranged in clusters in a single-level cell stripe 500 in the fifth striping mode. The fifth striping mode may be selected when, for example, striping a single-level cell stripe.

Successive data chunks may be sequentially arranged in clusters in one memory die. When data chunks are arranged in the clusters, data chunks may be arranged in clusters in a next memory die.

In the example of FIG. 12A, first to eighth data chunks may be first arranged in the first memory die DIE1. When the arrangement of the eighth data chunk is completed, data chunks may be flushed to the first memory die DIE1. Similarly, ninth to sixteenth data chunks may be arranged in the second memory die DIE2, seventeenth to 24th data chunks may be arranged in the third memory die DIE3, and 25th to 32nd data chunks may be arranged in the fourth memory die DIE4. When the arrangement of the respective sixteenth, 24th and 32nd data chunks is completed, data chunks may be flushed to the second, third and fourth memory dies DIE2, DIE3 and DIE4. When the program operation of the memory die is completed, related write commands may be removed from the write queue 146.

FIG. 12B illustrates the fifth lookup table 1200 corresponding to the fifth striping mode according to an embodiment. The fifth lookup table 1200 represents a lower address according to a queued order of a data chunk in the fifth striping mode. Since a single-level cell page may store one-bit data per memory cell, the single-level cell page may be handled as having one subpage. The lower address may be identified by one subpage address, four channel addresses, four plane addresses and two cluster addresses.

A lower address according to a queued order of a data chunk in the fifth lookup table 1200 may correspond to a cluster in which a queued order of the same data chunk is shown in FIG. 12A. As a queued order increases in the fifth lookup table 1200, a cluster address corresponding to the queued order may increase. When the cluster address is initialized after reaching a maximum value, a plane address may increase. A memory die address corresponding to the queued order may increase when the plane address is initialized after reaching a maximum value.

As described above with reference to FIGS. 8A to 9B, when receiving information on a striping mode and a queued order of a data chunk from the processor 134, the striping engine 138 may determine a lower address of the data chunk by referring to a lookup table corresponding to the striping mode and may provide the lower address to the processor 134.

As described above with reference to FIG. 8A, when a queued order received from the processor 134 is a last queued order of a lookup table, the striping engine 138 may notify the processor 134 that the queued order is the last queued order and may provide a lower address corresponding to the queued order to the processor 134. The processor 134 may initialize queued orders in response to the notification and update an upper address so that data chunks may be arranged in a next stripe.

The first to fifth lookup tables 800, 900, 1000, 1100 and 1200 are not limited to including lower addresses corresponding to all queued orders of data chunks. For example, each of lookup tables may include only a lower address corresponding to a queued order of a data chunk corresponding to the first cluster of the first plane PLANE1 in each subpage of each memory die. Lower addresses corresponding to remaining queued orders may be derived by performing an addition calculation from the lower address in the lookup table.

In the example of FIG. 9A, only lower addresses corresponding to some queued orders '1,' '9,' '17,' '25,' '31' and '39' among queued orders may be stored in the lookup table. When receiving a request from processor 134 for a lower address corresponding to the queued order '30' in the second striping mode, the striping engine 138 may search for a lower address SUBPAGE=1, CH=4, PLANE=1 and CLUSTER=1 of the queued order '25' in the lookup table and may provide SUBPAGE=1, CH=4, PLANE=3 and CLUSTER=2 to the processor 134 by performing an addition calculation from the lower address. When receiving a request for a lower address corresponding to the queued order '31,' the striping engine 138 may search for a lower address SUBPAGE=2, CH=1, PLANE=1 and CLUSTER=1 of the queued order '31' in the lookup table and may provide the searched lower address to the processor 134.

Figure 13:
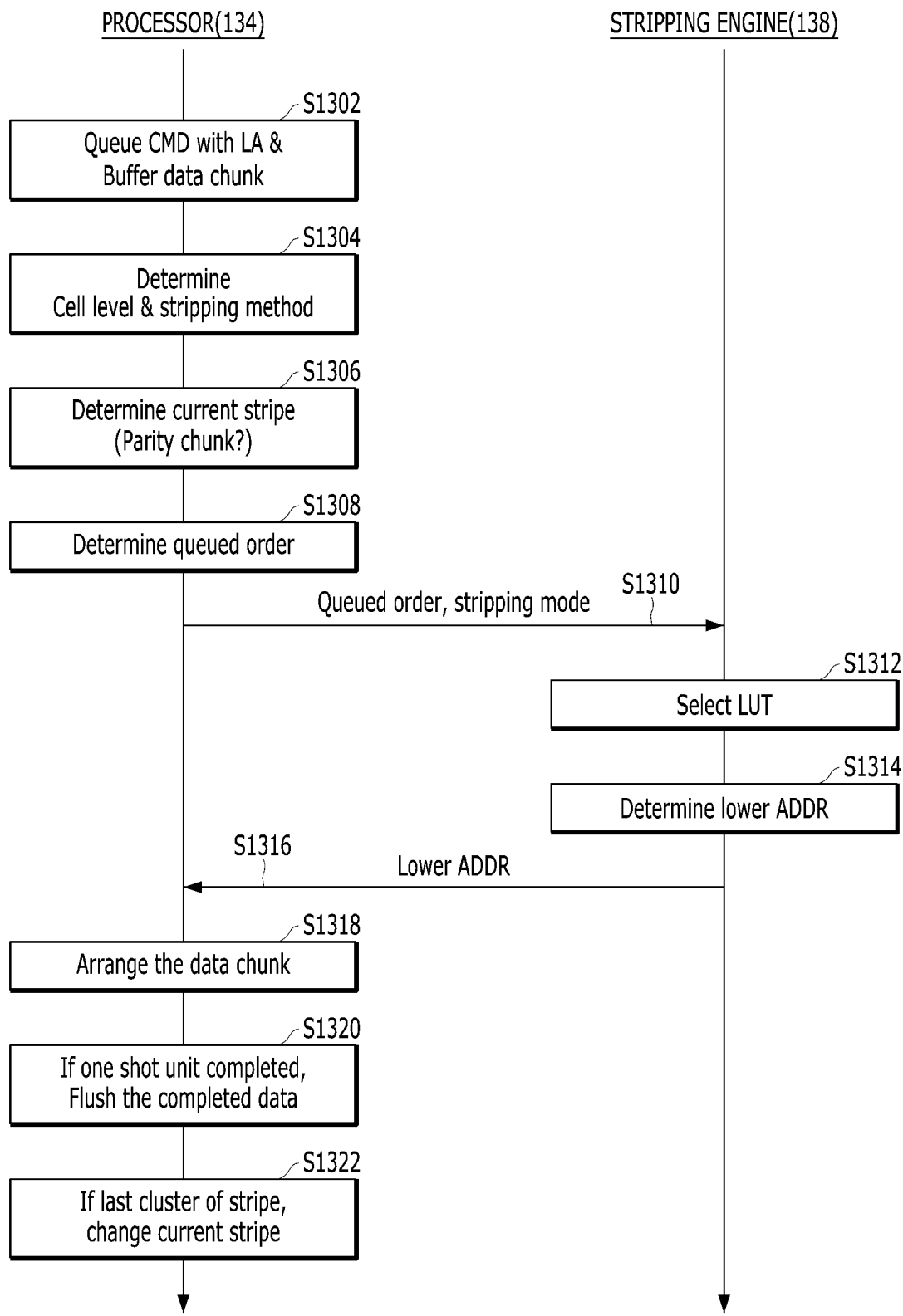
FIG. 13 illustrates an embodiment of operation of a controller according to a write command.

FIG. 13 shows an embodiment of a method that may be, partially or fully, performed by controller 130 according to a write command. At operation S1302, the processor 134 may queue a write command with a logical address and may buffer a data chunk, related with the write command, in the memory 144. The write command may be a host write command or a background write command, e.g., a GC write command.

At operation S1304, the processor 134 may determine a memory cell level to which the data chunk is to be programmed and a striping scheme. For example, the processor 134 may determine the memory cell level as a single-level cell when the data chunk corresponds to system data or data requiring reliability or when a program operation is performed in a single-level cell mode. The processor 134 may determine the memory cell level as a multi-level cell in the other cases.

While FIGS. 8A to 11B were described above by taking, as an example, a case where the multi-level cell is a triple-level cell, the multi-level cell may be another type different from a triple-level cell in another embodiment.

The processor 134 may determine the striping scheme as an interleaving-based striping scheme when the data chunk is a host data chunk, and may determine the striping scheme as a one-shot-based striping scheme when the data chunk is a GC data chunk.

At operation S1306, the processor 134 may determine a stripe to which the data chunk is to be programmed based on the memory cell level of the data chunk and the striping scheme. For example, the processor 134 may allocate different open super blocks for a program operation in a single-level cell mode and a program operation in a multi-level cell mode. An open super block as a super block allocated for a current program operation may refer to a super block in which all stripes have not yet been programmed. The processor 134 may allocate different open super blocks for a host data chunk and a GC data chunk.

The processor 134 may select any one open super block among a plurality of open super blocks and may determine a stripe to which the data chunk is to be programmed, so that stripes of the open super block are sequentially programmed. The processor 134 may store current stripe information in memory 144. The current stripe information may indicate to which stripe a data chunk is to be programmed in each open block.

Whether a parity chunk is to be inserted into the stripe may be determined based on an address of the stripe. For example, the processor 134 may generate parity chunks by performing logic calculations on data chunks stored in a predetermined number of stripes in an open super block. The processor 134 may then program the parity chunks to a predetermined region of a stripe having a last address among the stripes. For example, when the processor 134 generates parity chunks by collecting data chunks of four stripes, the processor 134 may not insert the parity chunks into first to third stripes. The processor 134 may generate parity chunks by performing logic calculations on data chunks included in the first to fourth stripes, and may insert the parity chunks into the fourth plane PLANE4 of the fourth memory die DIE4 of the fourth stripe.

At operation S1308, the processor 134 may determine a queued order of the queued write command. For example, processor 134 may count the number of times a command is queued in each of the host queue HQ and the GC queue GQ in the write queue 146.

At operation S1310, the processor 134 may provide the queued order information and striping mode information to striping engine 138. A striping mode may be determined based on a memory cell level, a striping scheme, and/or whether a parity chunk is to be inserted.

At operation S1312, the striping engine 138 may select any one of a plurality of lookup tables, stored in the memory 144, based on the striping mode information obtained from the processor 134. Each of the lookup tables may include lower address information of a data chunk according to a queued order of a write command in each striping mode. Various examples of striping modes and lookup tables corresponding to the striping modes were described with reference to FIGS. 8A to 12B.

At operation S1314, the striping engine 138 may determine a lower address of the data chunk based on the queued order information obtained from the processor 134 and the selected lookup table.

At operation S1316, the striping engine 138 may provide the lower address to the processor 134. When the queued order obtained from the processor 134 corresponds to a last queued order of the selected lookup table, the striping engine 138 may notify the processor 134 that the queued order is a last queued order.

At operation S1318, the processor 134 may arrange the data chunk in a cluster based on the lower address obtained from striping engine 138. For example, the processor 134 may arrange the data chunk in a cluster by updating map data between the logical address and a physical address related with the data chunk. The processor 134 may determine the physical address of the data chunk based on the address of the current stripe determined at operation S1306 and the lower address of the data chunk.

At operation S1320, when data having a size corresponding to a one-shot program unit is completed, the processor 134 may flush the completed data to the memory device 150. The data having a size corresponding to a one-shot program unit may refer to data chunks or parity chunks which are arranged in clusters in one memory die among clusters in one stripe. When the data having a size corresponding to a one-shot program unit is completed, the processor 134 may flush the completely arranged data by providing a write command to a memory die including the clusters.

At operation S1322, when the processor 134 is notified by the striping engine 138 that the queued order is a last queued order, the processor 134 may initialize the number of times a command is queued in the write queue 146 and may change the current stripe to a next stripe.

Figure 14:
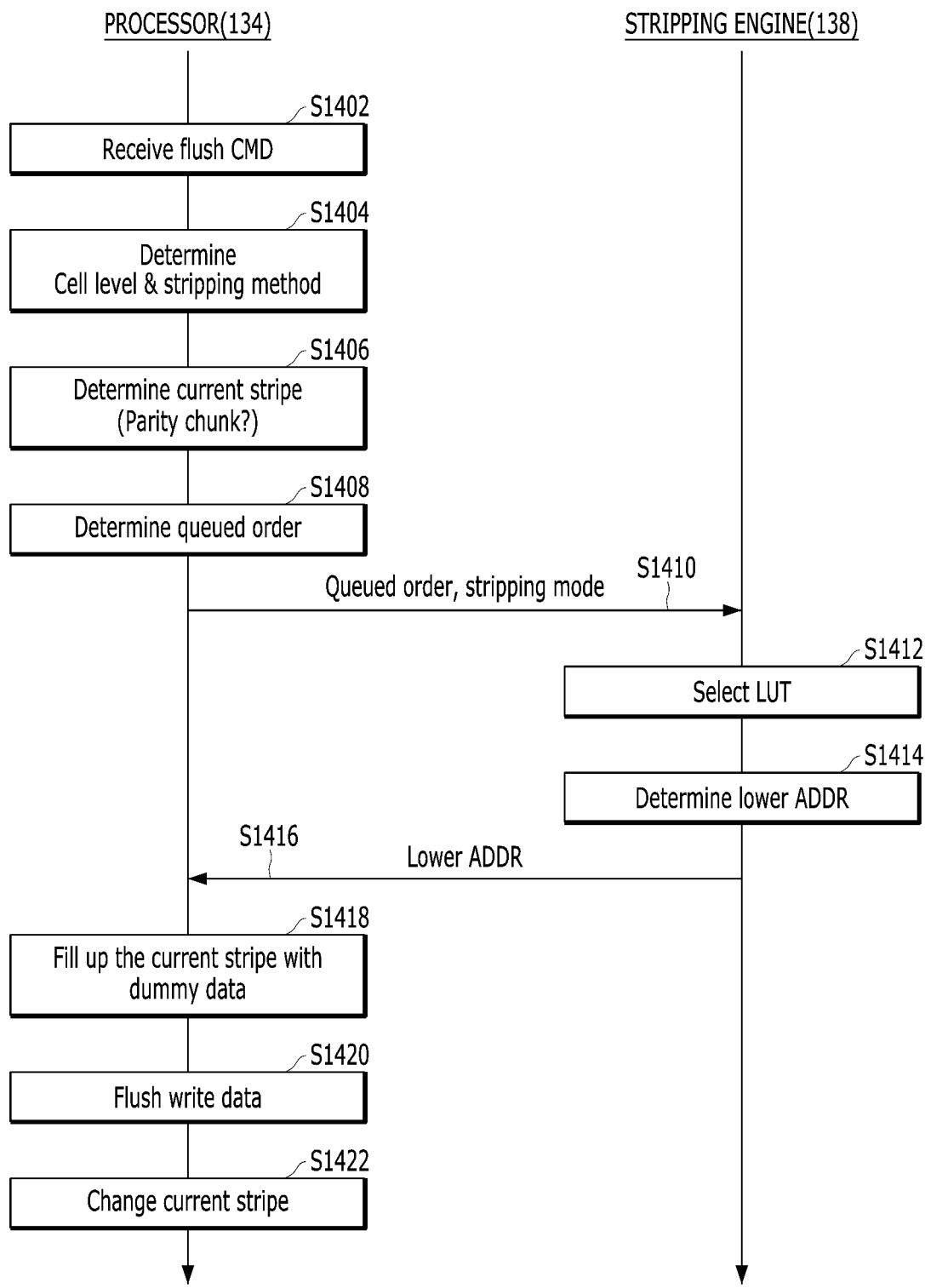
FIG. 14 illustrates an embodiment of operation of a controller according to a flush command.

FIG. 14 shows an embodiment of a method which may be, partially or fully, performed by the controller 130 according to a flush command. The host 102 may provide a flush command to the controller 130, so that write data provided to the memory system 110 is completely programmed to the memory device 150. The controller 130 may provide, to the memory device 150, a write command for data chunks buffered in the memory 144 in response to the flush command. In the case where the data chunks buffered in the memory 144 do not completely have a size corresponding to a one-shot program unit, the controller 130 may add dummy chunks to the data chunks to complete data having a size corresponding to a one-shot program unit. The controller 130 may also provide a write command for the completed data to the memory device 150.

At operation S1402, the processor 134 may receive a flush command from the host 102 and may queue the flush command in the write queue 146. For example, the flush command may be queued in the host queue HQ.

At operation S1404, the processor 134 may determine a memory cell level of a stripe to which dummy chunks should be added and a striping scheme. A memory cell level of data chunks buffered in the memory 144 and a striping scheme may be determined in advance by the operation S1304 of FIG. 13. Also, the processor 134 may determine a memory cell level of a stripe to which dummy chunks should be added and a striping scheme by referring to the memory cell level and the striping scheme determined in advance.

At operation S1406, the processor 134 may determine a stripe to which dummy chunks should be added. A stripe to which data chunks buffered in the memory 144 are to be programmed may be determined in advance by operation S1306 of FIG. 13. The processor 134 may determine the stripe to which dummy chunks should be added by referring to the stripe determined in advance. The processor 134 may further determine whether a parity chunk is to be inserted based on an address of the determined stripe.

At operation S1408, in order to determine a cluster of the stripe in which a dummy chunk is to be arranged, the processor 134 may determine an order in which the flush command is queued. For example, the processor 134 may count the number of times a command is queued in the host queue HQ.

At operation S1410, the processor 134 may provide the queued order information and striping mode information to the striping engine 138. The processor 134 may determine a striping mode based on the memory cell level, a striping scheme and/or whether a parity chunk is to be inserted.

At operation S1412, the striping engine 138 may select any one of a plurality of lookup tables stored in the memory 144 based on the striping mode information obtained from the processor 134.

At operation S1414, the striping engine 138 may determine lower addresses of clusters in which dummy data need to be arranged by referring to the selected lookup table. For example, the striping engine 138 may determine lower addresses corresponding to the queued order obtained from the processor 134 and orders after the queued order.

At operation S1416, the striping engine 138 may provide the lower addresses to the processor 134.

At operation S1418, the processor 134 may fill the current stripe with dummy data. For example, the processor 134 may arrange a dummy chunk in a cluster of the current stripe in which a data chunk is not arranged by referring to the lower addresses from the striping engine 138.

At operation S1420, the processor 134 may flush the stripe including the data chunks and the dummy chunks to the memory device 150.

At operation S1422, the processor 134 may initialize, in the write queue 146, the number of times a command is queued and may change the current stripe to a next stripe.

According to one or more embodiments, in order to stripe a plurality of data chunks, the processor 134 may provide a striping mode and queued orders, related with the data chunks, to the striping engine 138. The striping engine 138 may select a lookup table based on the striping mode, and may determine lower addresses related with the plurality of data chunks by referring to the selected lookup table and the queued orders. The processor 134 may stripe the plurality of data chunks by arranging the plurality of data chunks in clusters based on the lower addresses.

In one embodiment, the striping engine 138 may be implemented by a hardware circuit capable of determining lookup tables and performing calculations of selecting lower addresses by referring to the lookup tables. For example, the processor 134 may obtain a lower address by providing a queued order related with a data chunk to the striping engine 138, instead of performing a calculation of determining a lower address of a cluster in which the data chunk is to be arranged, based on a lower address of a cluster in which a data chunk is previously arranged. Therefore, the processor 134 may improve the performance of the memory system 110 by offloading a striping operation by the striping engine 138.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

When implemented in at least partially in software, the controllers, processors, engines, devices, modules, units, interfaces, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Although various embodiments have been described for illustrative purposes, it will be apparent to those skilled in the art that various changes and modifications may be made without departing from the spirit and scope of the disclosure as defined in the following claims. The embodiments may be combined to form additional embodiments.

What is claimed is:

1. A memory system comprising:
a memory device including a plurality of memory blocks that include a plurality of physical pages, a plurality of planes including the plurality of memory blocks, and a plurality of memory dies including the plurality of planes, the plurality of planes being configured to operate in parallel to one another; and
a controller configured to store data in a plurality of stripes, each including physical pages of different planes and a plurality of unit regions, the controller comprising:
a processor configured to queue write commands in a write queue and select, among the plurality of stripes, a stripe in which data chunks corresponding to the write commands are to be stored; and
a striping engine configured to receive from the processor information on a) a numeric sequence of queue numbers with each queue number representing a queued order of the write commands in the write queue and b) a striping mode to be used, and output to the processor, by referring to a lookup table, addresses of unit regions in which the data chunks are to be arranged, wherein each address in the lookup table being referred to is based on the striping mode being used and on the respective queue number of the write command, and
wherein the processor is configured to control the memory device to store and arrange the data chunks in the unit regions corresponding to the outputted addresses of the selected stripe.

2. The memory system according to claim 1, wherein the processor generates map data which maps a physical address of one data chunk to a logical address of the data chunk, and
the physical address is determined based on the logical address of the data chunk, the outputted address of the selected stripe and the addresses of the unit regions.

3. The memory system according to claim 1, wherein, when the data chunks to be stored in all unit regions included in one memory die of the selected stripe are arranged, the processor controls the memory device to store the data chunks.

4. The memory system according to claim 2, wherein the physical page includes one or more unit regions, and
a number of the unit regions in the physical page is determined depending on a number of subpages, determined depending on a memory cell level of the physical page and a size of the data chunk.

5. The memory system according to claim 1, wherein the striping engine notifies the processor when the provided queued order corresponds to a last entry in the lookup table, and
the processor, in response to the notification, changes the selected stripe where data is to be arranged.

6. The memory system according to claim 1, wherein, after all of the data chunks belonging to one unit region of the selected stripe have been arranged therein per the striping mode,
the processor queues a flush command from a host in the write queue and provides a queued order of the flush command to the striping engine,
the striping engine by referring to the lookup table and based on the queued order of the flush commands determines unit regions in which data chunks are not yet arranged, among a plurality of unit regions of the selected stripe, and
the processor controls the memory device to store dummy chunks in the unit regions in which data chunks are not arranged.

7. The memory system according to claim 4, wherein
a memory address of the unit region includes a plane address, a memory die address and a subpage address, and
a memory address of the selected stripe includes a memory block address and a physical page address.

8. The memory system according to claim 1, wherein the striping engine selects the lookup table to be referred to, among a plurality of lookup tables, by receiving from the processor the information on the striping mode to be used.

9. The memory system according to claim 8, wherein
the memory device includes a plurality of open super blocks, each of the plurality of open super blocks including memory blocks of different planes, and
the processor selects one of the plurality of open super blocks based on a type of the data chunk, and the one open super block selected has stripes for sequentially storing the data chunks.

10. The memory system according to claim 9, wherein the processor
stores data chunks from the host in an interleaving-based stripping mode in which consecutive data chunks are interleaved over a plurality of dies, and
stores data chunks obtained from the memory device, in a one-shot-based stripping mode where the data chunks are successive data chunks arranged sequentially between memory dies.

11. The memory system according to claim 8, wherein the processor generates a parity chunk in accordance with operations that include performing a logic calculation on the data chunks stored in one or more stripes including the selected stripe.

12. The memory system according to claim 11, wherein the processor determines whether to store the parity chunk, in a predetermined unit region of the selected stripe, based on a memory address of the selected stripe.

13. The memory system according to claim 10, wherein
the processor selects the striping mode as a first mode when the selected stripe includes physical pages that include a plurality of subpages and the data chunks are stored in the selected stripe in the interleaving-based stripping mode,
the striping engine selects a first lookup table among the plurality of lookup tables, by receiving the first mode,
the first lookup table includes addresses of unit regions for each queued order received from the processor, and
a plane address corresponding to the queued order increases as the queued order increases, a memory die address increases when the plane address is initialized after reaching a maximum value, and a subpage address increases when the memory die address is initialized after reaching the maximum value.

14. The memory system according to claim 10, wherein the processor selects the striping mode as a second mode when the selected stripe includes physical pages that include a plurality of subpages, the data chunks are stored in the selected stripe based on the interleaving-based stripping mode, and a parity chunk is stored in a predetermined unit region of the selected stripe,
the striping engine selects a second lookup table among the plurality of lookup tables, by receiving the second mode,
the second lookup table includes addresses of unit regions, except the predetermined unit region, for each queued order received from the processor, and
a plane address corresponding to the queued order increases as the queued order increases, a memory die address increases when the plane address is initialized after reaching a maximum value, and a subpage address increases when the memory die address is initialized after reaching the maximum value.

15. The memory system according to claim 10, wherein the processor selects the striping mode as a third mode when the selected stripe includes physical pages that include a plurality of subpages and the data chunks are stored in the selected stripe based on the one-shot-based stripping mode,
the striping engine selects a third lookup table among the plurality of lookup tables, by receiving the third mode,
the third lookup table includes addresses of unit regions for each queued order received from the processor, and
a plane address corresponding to the queued order increases as the queued order increases, a subpage address increases when the plane address is initialized after reaching a maximum value, and a memory die address increases when the subpage address is initialized after reaching the maximum value.

16. The memory system according to claim 10, wherein the processor selects the striping mode as a fourth mode when the selected stripe includes physical pages that include a plurality of subpages, the data chunks are stored in the selected stripe in the one-shot-based stripping mode, and a parity chunk is stored in a predetermined unit region of the selected stripe,
the striping engine selects a fourth lookup table among the plurality of lookup tables, by receiving the fourth mode,
the fourth lookup table includes addresses of unit regions, except the predetermined unit region, for each queued order received from the processor, and
a plane address corresponding to the queued order increases as the queued order increases, a subpage address increases when the plane address is initialized after reaching a maximum value, and a memory die address increases when the subpage address is initialized after reaching the maximum value.

17. The memory system according to claim 8, wherein the processor selects the striping mode as a fifth mode when the selected stripe includes single-level cell physical pages,
the striping engine selects a fifth lookup table among the plurality of lookup tables, by receiving the fifth mode,
the fifth lookup table includes addresses of unit regions, except the predetermined unit region, for each queued order received from the processor, and
a plane address corresponding to the queued order increases as the queued order increases, and a memory die address increases when the plane address is initialized after reaching a maximum value.

18. A method for operating a memory system including a plurality of memory blocks that include a plurality of physical pages, a plurality of planes including the plurality of memory blocks and a plurality of memory dies including the plurality of planes, the plurality of planes being configured to operate in parallel to one another, the method comprising:
queuing write commands in a write queue;
selecting, among a plurality of stripes, a stripe in which data chunks corresponding to the write commands are to be stored, each of the plurality of stripes including physical pages of different planes and a plurality of unit regions;
determining, based on information received from a processor on a) a numeric sequence of queue numbers with each queue number representing a queued order of the write commands in the write queue and b) a striping mode to be used and by referring to a lookup table, addresses of unit regions corresponding to queued orders of the write commands, as addresses of unit regions in which the data chunks are to be arranged, wherein each address in the lookup table being referred to is based on the striping mode being used and on the respective queue number of the write command; and
storing and arranging the data chunks in the unit regions of the selected stripe corresponding to the determined addresses.

19. The method according to claim 18, further comprising:
changing the selected stripe and initializing the queued order of each of the write commands when the queued order is a last entry in the lookup table.

20. The method according to claim 18, further comprising:
after all of the data chunks belonging to one unit region of the selected stripe have been arranged therein per the striping mode, queuing a flush command from a host in the write queue; and
storing, by referring to the lookup table and based on the queued order of the flush commands, dummy chunks in unit regions in which data chunks are not yet arranged, among a plurality of unit regions of the selected stripe.

21. The method according to claim 18, wherein
a memory address of the unit region includes a plane address, a memory die address and a subpage address, and
a memory address of the selected stripe includes a memory block address and a physical page address.

22. The method according to claim 18, further comprising:
selecting the lookup table to be referred to, among a plurality of lookup tables, based on the striping mode being used.

23. A memory system comprising:
a memory device including a plurality of memory blocks that include a plurality of physical pages, a plurality of planes including the plurality of memory blocks, and a plurality of memory dies including the plurality of planes, the plurality of planes being configured to operate in parallel to one another; and
a controller configured to:
store data in a plurality of stripes, each including physical pages of different planes and a plurality of unit regions,
queue write commands in a write queue;

select, among the plurality of stripes, a stripe in which data chunks corresponding to the write commands are to be stored;

determine, based on information received from a processor on a) a numeric sequence of queue numbers with each queue number representing a queued order of the write commands in the write queue and b) a striping mode to be used and by referring to a lookup table, addresses of unit regions corresponding to queued orders of the write commands, as addresses of unit regions in which the data chunks are to be arranged, wherein each address in the lookup table being referred to is based on the striping mode being used and on the respective queue number of the write command; and store and arrange the data chunks in the unit regions of the selected stripe corresponding to the determined addresses.

* * * * *